United States Patent [19]

Ina et al.

[11] Patent Number: 5,729,715
[45] Date of Patent: Mar. 17, 1998

[54] FILING SYSTEM WITH MULTIPLE FORMS OF STORAGE

[75] Inventors: Kenzo Ina; Tamotsu Nakazawa, both of Yokohama, Japan

[73] Assignee: Canon Kabushiki Kaisha, Tokyo, Japan

[21] Appl. No.: 302,942

[22] Filed: Sep. 9, 1994

Related U.S. Application Data

[63] Continuation of Ser. No. 940,736, Sep. 8, 1992, abandoned, which is a continuation of Ser. No. 650,987, Feb. 4, 1991, abandoned, which is a continuation of Ser. No. 926,522, Nov. 4, 1986, abandoned.

[30] Foreign Application Priority Data

| Nov. 6, 1985 | [JP] | Japan | 60-248584 |
| Nov. 6, 1985 | [JP] | Japan | 60-248585 |
| Nov. 6, 1985 | [JP] | Japan | 60-248586 |
| Nov. 6, 1985 | [JP] | Japan | 60-248587 |
| Nov. 6, 1985 | [JP] | Japan | 60-248588 |
| Nov. 6, 1985 | [JP] | Japan | 60-248589 |
| Nov. 6, 1985 | [JP] | Japan | 60-248590 |

[51] Int. Cl.$^6$ ........................................... G06F 12/16
[52] U.S. Cl. ............................... 395/489; 395/620
[58] Field of Search ........................... 395/162, 164, 395/400, 425, 615, 620, 488, 489; 358/403; 364/419.19

[56] References Cited

U.S. PATENT DOCUMENTS

| 3,801,963 | 4/1974 | Chen | 360/5 |
| 3,911,400 | 10/1975 | Levy et al. | 395/183.21 |
| 4,121,283 | 10/1978 | Walker | 345/119 |
| 4,139,901 | 2/1979 | Ganske et al. | 395/616 |
| 4,270,182 | 5/1981 | Asija | 395/759 |

(List continued on next page.)

FOREIGN PATENT DOCUMENTS

| 103295 | 3/1984 | European Pat. Off. . |
| 122467A2 | 10/1984 | European Pat. Off. . |
| 1300050 | 1/1985 | European Pat. Off. . |
| 156923 | 3/1985 | European Pat. Off. . |
| 0156923 | 9/1985 | European Pat. Off. . |

OTHER PUBLICATIONS

"Overview of the Toshiba DOD-Based Archiving System: The Tosfile 2100", in Memories Optiques, No. 11, pp. 7–13 (Jan. 1985).

McDowell, P.M., "Computer-Controlled Microform Search System for Patent Searching", JPOS, Mar. 1977, vol. 59, No. 3, pp. 175–179.

*Primary Examiner*—Matthew M. Kim
*Assistant Examiner*—Kevin L. Ellis
*Attorney, Agent, or Firm*—Fitzpatrick, Cella, Harper & Scinto

[57] ABSTRACT

There is a composite image filing system in which optical discs and microfilms are organically combined and integrally managed. This system comprises optical discs and microfilms in which image files are recorded and a work station to register, search, and process the image files. The work station has a memory to store search information of a format integrated between the optical disc and the microfilm. The search information which specifies the image files includes information indicative of the kind of medium (microfilm and optical disc), information to specify the medium number of the optical disc and the physical address in the optical disc in the case of a optical disc file or to specify the cartridge number and frame number in the case of a microfilm file, and the file name. The work station manages the image files by the search information and controls the optical disc so as to back up the search information corresponding to the image files recorded in the optical discs. Since the search information of the image files is stored into a backup dedicated memory such as optical disc or floppy disc nearest to the operation unit, the security of the search information is assured and the search information can be easily managed and reconstructed from the backup dedicated memory.

15 Claims, 30 Drawing Sheets

U.S. PATENT DOCUMENTS

| | | | |
|---|---|---|---|
| 4,400,777 | 8/1983 | Mori | 395/117 |
| 4,408,287 | 10/1983 | Parisot et al. | 353/27 A |
| 4,485,454 | 11/1984 | Kimoto | 395/603 |
| 4,509,139 | 4/1985 | Creager, Sr. | 395/885 |
| 4,513,390 | 4/1985 | Walter et al. | 395/800 |
| 4,682,305 | 7/1987 | Ishikawa | 395/438 |
| 4,686,620 | 8/1987 | Ng | 395/610 |
| 4,710,870 | 12/1987 | Blackwell et al. | 395/182.04 |
| 4,720,708 | 1/1988 | Takeda et al. | 345/213 |
| 4,882,669 | 11/1989 | Miura et al. | 364/184 |
| 4,959,774 | 9/1990 | Davis | 395/182.04 |
| 4,996,664 | 2/1991 | Fujiwara et al. | 345/201 |
| 5,218,673 | 6/1993 | Fujiwara | 395/508 |

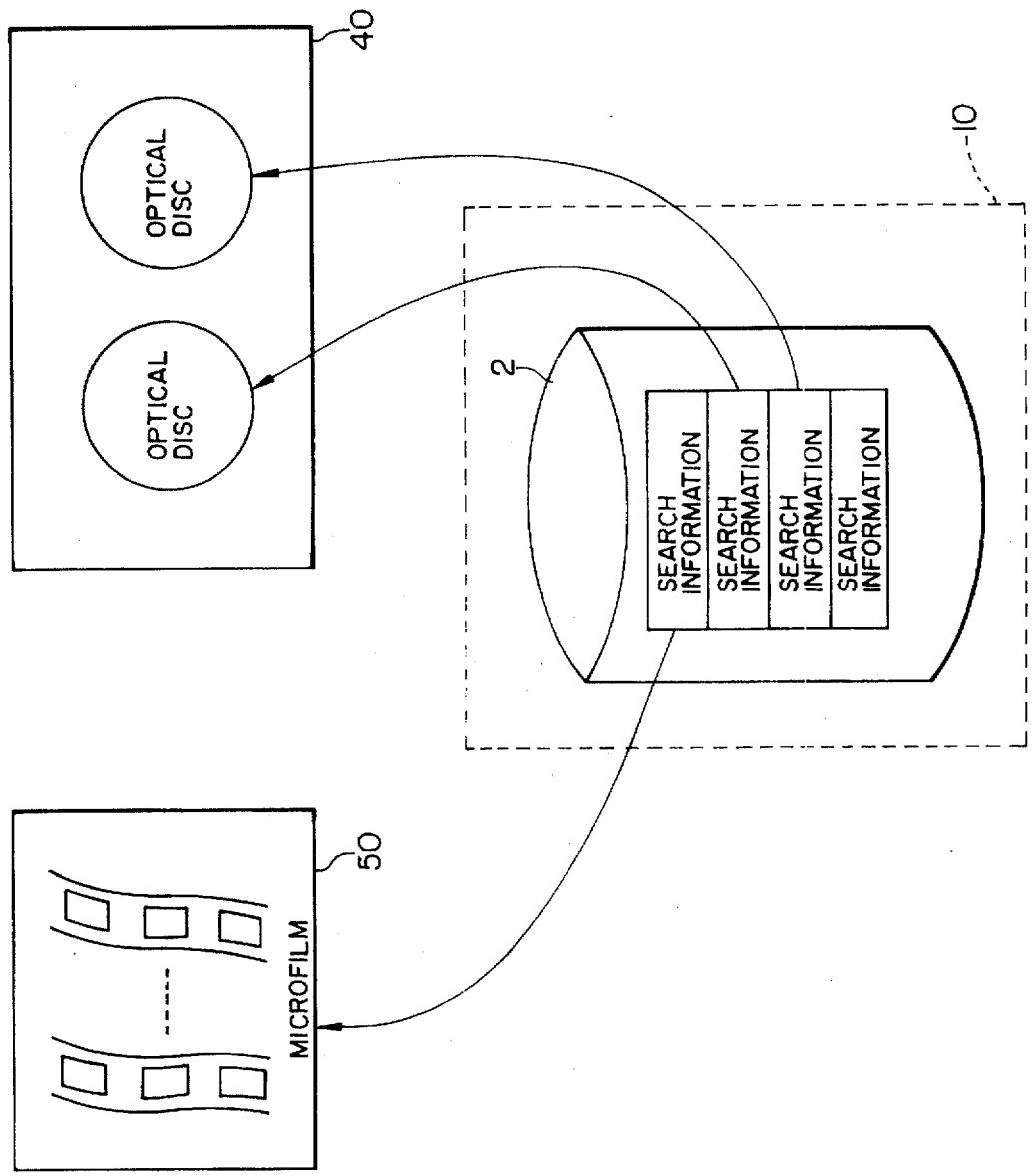

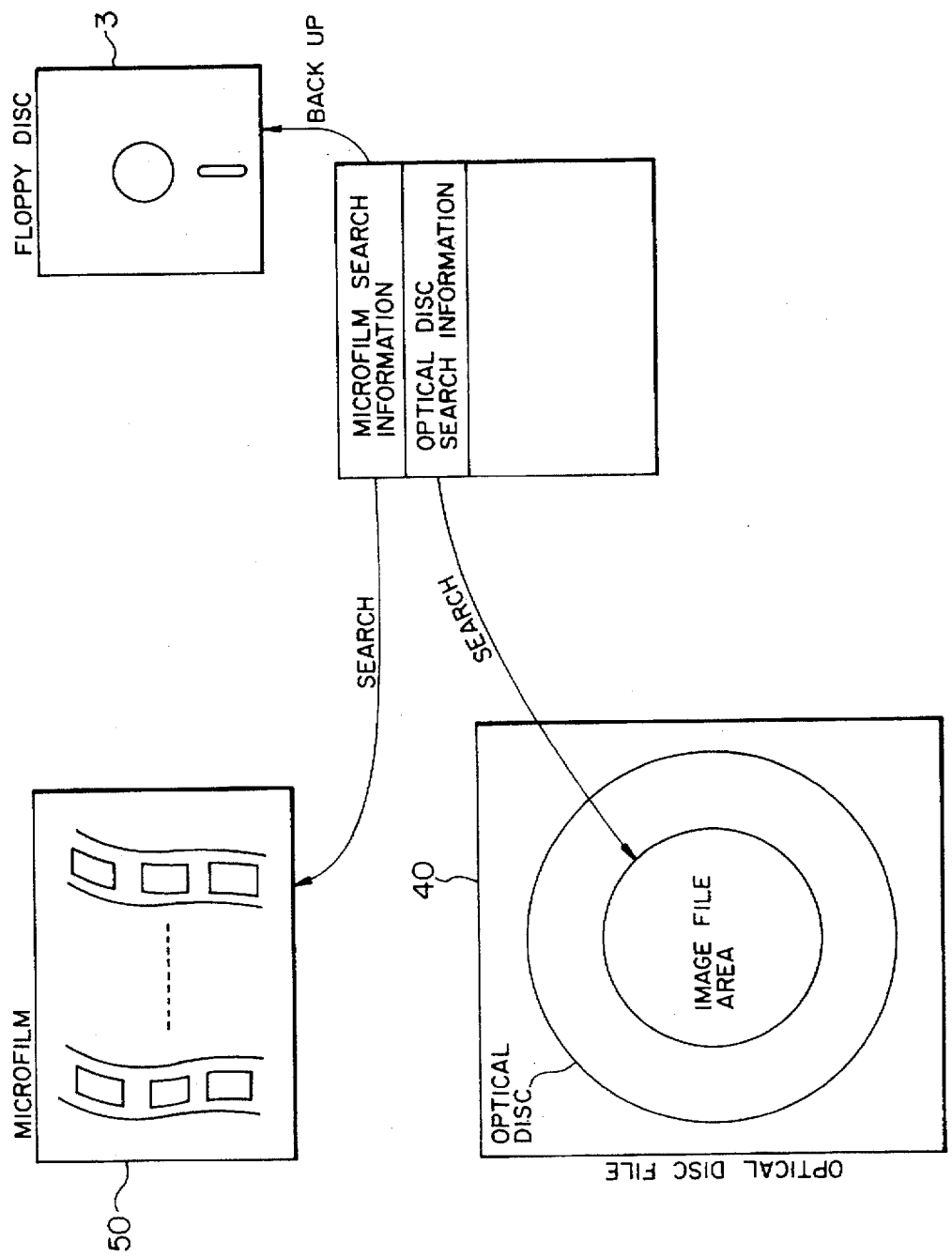

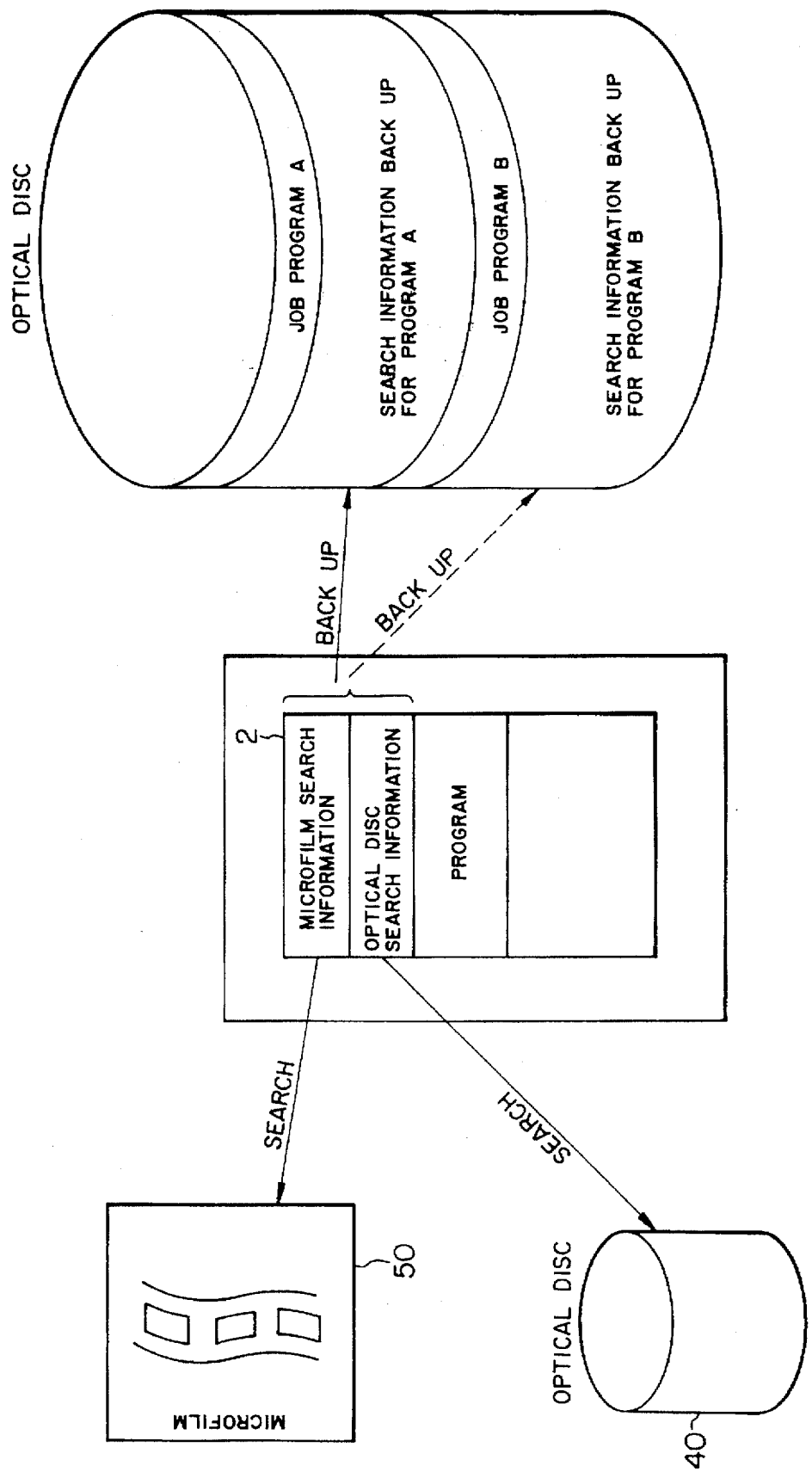

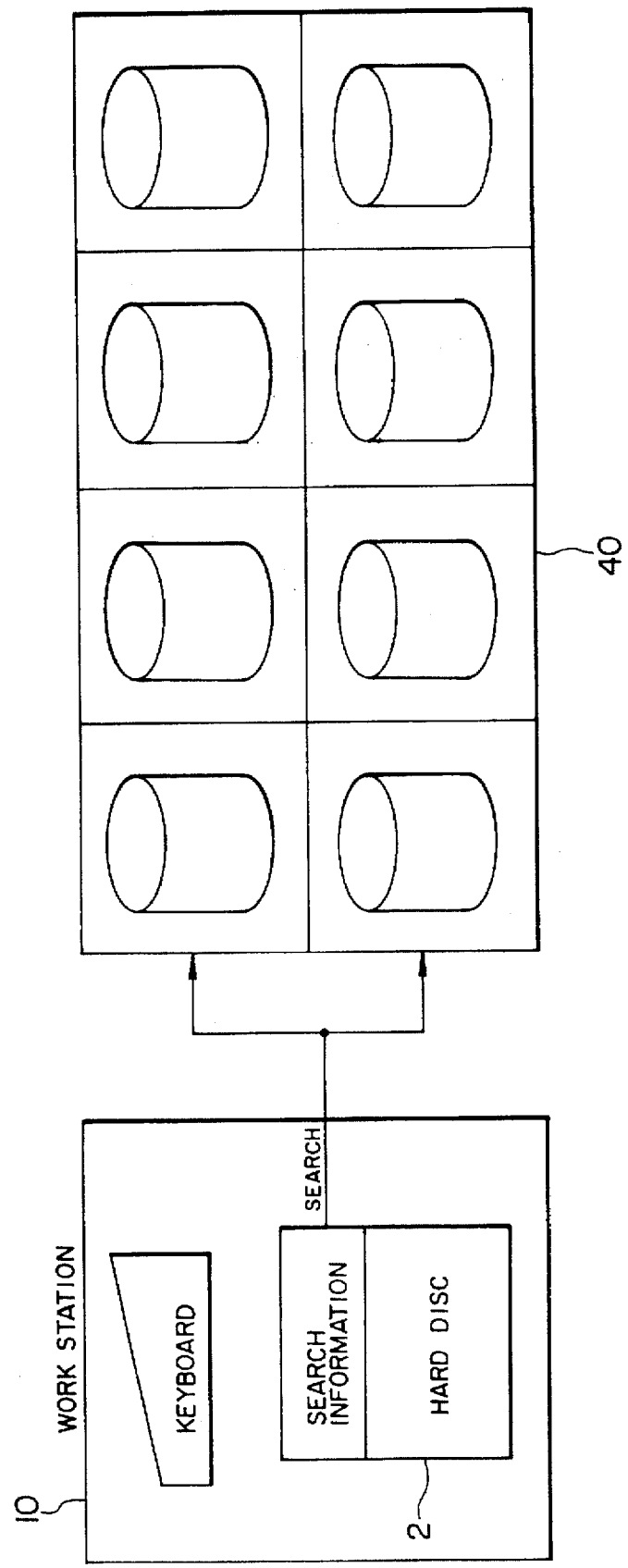

FIG. 17A

| TYPE OF RECORD | |
|---|---|

70

0: DISC TYPE RECORD
1: JOB RECORD
2: SEARCH INFORMATION RECORD
3: PROGRAM RECORD

FIG. 17B

| "0" | TYPE OF DISC | |
|---|---|---|

70    71

0: BACK UP OPTICAL DISC
1: IMAGE FILE OPTICAL DISC

FIG. 17C

| "1" | JOB NAME | DATE | VOLUME NAME | VOLUME NAME |
|---|---|---|---|---|

| "2" | SEARCH INFORMATION RECORD | SEARCH INFORMATION RECORD | |
|---|---|---|---|

| "3" | PROGRAM CODE |
|---|---|

| "0" | JOB RECORD | "2" | SEARCH INFORMATION | "2" | SEARCH INFORMATION | "2" | ~ | "3" | JOB PROGRAM |
|---|---|---|---|---|---|---|---|---|---|
| 80 | 81 | | 82 | | 82 | | | | 83 |

FIG. 18B

| "1" | JOB RECORD | "2" | SEARCH INFORMATION | "2" | SEARCH INFORMATION | "2" | ~ | "3" | JOB PROGRAM |
|---|---|---|---|---|---|---|---|---|---|
| | 84 | | 85 | | 85 | | | | 86 |

FIG. 19A

| "0" | "2" | "4" | "6" |
|---|---|---|---|
| "1" | "3" | "5" | "7" |

DISC DRIVE 40

FIG. 19B

| #0 FLAG | #1 FLAG | #2 FLAG | ..... | #7 FLAG |
|---|---|---|---|---|

20

FILING SYSTEM WITH MULTIPLE FORMS OF STORAGE

This application is a continuation of application Ser. No. 07/940,736 filed Sep. 8, 1992, which was a continuation of application Ser. No. 07/650,987, filed Feb. 4, 1991, which was a continuation of application Ser. No. 06/926,522, filed Nov. 4, 1986, all now abandoned.

BACKGROUND OF THE INVENTION

1. Field of the Invention

The present invention relates to a composite image filing system consisting of, for example, microfilm files and optical disc files and, more particularly, to the backup of the composite image filing system.

2. Related Background Art

Hitherto, a microfilm system has been used as a system to manage and use an extremely large amount of noncode information (image information). Microfilms are excellent in terms of economics, preservation, resolution and the like, and have the advantages that the input speed is high and a large quantity of copies can be processed at a high speed. Therefore, the microfilms are suitable to efficiently preserve and manage file information which is more and more increasing every year.

However, on the other hand, in recent years, office automation has greatly advanced and there is a strong trend toward using computers in office equipment and units of the equipment are mutually coupled by communication circuits. To cope with this trend of computerization and communication network, it is desirable that the information to be handled is preserved in a format of electrical signals to the extent possible. Therefore, an electronic filing system has recently attracted the spotlight of attention. Since the electronic filing system preserves the information in the format of electronic signals, it has the features that the information can be searched and transmitted at a high speed and the like, which features cannot be achieved by the microfilm system. On the other hand, the electronic filing system also has the drawback that it loses some of the advantages of the conventional microfilm filing system.

Namely, the electronic filing system has the following disadvantages. When information is input, it is impossible to convert image by the one-shot operation through the lens system, which operation can be realized as in the microfilm system. The image must be converted by raster scanning it line by line, so that the input speed is slow. Copies in quantities below hundreds of sheets cannot be economically made at a high speed. It is uncertain whether the information can be preserved for a long time or not as compared with the microfilm, which can stably preserve the information for a long time of, e.g., 100 years. Electronic file information has not yet been accorded the weight of legal evidence, although such weight is given in the case of microfilm. There is the further serious problem that if the electronic filing system is installed, the data base and information which have conventionally been created and stored by use of the microfilm system cannot be used.

As previously mentioned, both of the microfilm system and the electronic filing system also have advantages, respectively. When considering the recent tendency of automatization in offices, the electronic filing system has many advantages; however, it is obvious that the microfilm system cannot be ignored at all. Therefore, the user cannot help feeling a practical inconvenience in having to select either one of these two systems or to simultaneously use both systems in parallel.

Therefore, a composite image filing system in which the microfilm system and optical disc filing system are combined is being developed. In such a filing system in which different kinds of recording media are combined, it is demanded to organically couple them instead of accepting a mere combination. The realization of the composite image filing system in which the microfilm and optical disc are organically combined and the file management can be integrally performed is demanded.

The composite image filing system in which the microfilm filing system and optical disc filing system are combined is proposed in U.S. patent application Ser. No. 658,759 (filed on Oct. 9, 1984). As related art, the following techniques are known:

(1) U.S. Pat. No. 4,400,777 (Mori), filed on Jun. 3, 1981, disclosing the technique to record the output of the computer into the microfilm;

(2) U.S. Pat. No. 4,139,901 (Ganske), filed on May 4, 1977, disclosing the technique for accessing a desired document on film in the system having a plurality of terminals;

(3) U.S. Pat. No. 4,270,182 (Asija), filed on Dec. 30, 1974, disclosing the technique regarding the optomagnetic disk and microfilm in editing or processing the data, which is similar to the technique of Ganske; and (4) U.S. Pat. No. 4,513,390 (Walter), filed on Nov. 16, 1981, disclosing the technique for synthesizing the image by way of the document scanner 10, micrographic scanner 12, and the like.

However, the techniques disclosed in the above references have the following problems.

In the image filing system in which the microfilm and optical disc are combined (the system constituted by different recording media), an amount of search information to search the image files becomes obviously fairly large in correspondence to an amount of image files. It is the serious subject to certainly preserve and easily manage such a great amount of search information.

SUMMARY OF THE INVENTION

The present invention is made in consideration of the foregoing problems and it is an object of the invention to provide a composite image filing system in which a plurality of microfilms and a plurality of optical discs are combined and the file management can be integrally performed and at the same time, a great amount of search information can be reliably preserved and can be easily managed.

The invention is made in consideration of the foregoing problems and it is a feature of one aspect of the invention that in the filing system, the backup of the search information of the optical disc in which the image information was stored is performed by this optical disc.

The invention is made in consideration of the foregoing problems and it is another feature of one aspect of the invention that in the filing system, a floppy disc is used to back up the search information of the image stored in the microfilm.

The invention is made in consideration of the foregoing problems and it is another feature of one aspect of the invention that in the filing system, the backup of the hard disc in which the search information and programs where stored in performed by an optical disc.

The invention is made in consideration of the foregoing problems and it is another feature of one aspect of the invention that in the filing system, the backup of all of the search information sorted for every program (on a JOB unit basis) is stored into an optical disc.

The invention is made in consideration of the foregoing problems and it is another feature of one aspect of the invention that in the filing system, only the search information which will be used in the search information sorted for every program (on a JOB unit basis) is developed on a hard disc (HD) 2, thereby reconstructing the search information.

The invention is made in consideration of the foregoing problems and it is another feature of one aspect of the invention that in the filing system, when the search information in a work station is backed up in an optical disc, desired priorities are set into a plurality of drives of the optical disc and the search information is stored therein in accordance with the priorities.

The optical disc and hard disc which are used in this invention are not limited to these types but denote a storing medium having a large capacity and a storing medium having a capacity smaller than that.

The above and other objects and features of the present invention will become apparent from the following detailed description and the appended claims with reference to the accompanying drawings.

BRIEF DESCRIPTION OF THE DRAWINGS

FIGS. 1A to 1G are diagrams for explaining the outline of the present invention;

FIGS. 17A to 17E are format diagrams of respective records of backup files which are stored into an optical disc which is used for only the backup;

FIGS. 18A and 18B are diagrams of examples of backup files stored in an optical disc which is used for only the backup;

FIGS. 19A and 19B are diagram showing the maximum constitution of optical disc drives and a diagram showing a constitution in a DMEM of flags indicative of the use states of the respective drives;

DETAILED DESCRIPTION OF THE PREFERRED EMBODIMENTS

The present invention will be described hereinbelow with reference to the drawings.

(a) FIG. 1A is a schematic explanatory diagram of the invention.

FIG. 1A shows a construction of a composite image filing system of an embodiment. This filing system comprises an optical disc file 40 having functions to read and write images, a microfilm file 50 to read the images from microfilms, and a work station 10. The work station 10 has therein, for example, a hard disc (HD) 2 as memory means. The search information to search a desired file, namely, the search information having the format which is common to both of the microfilm and the optical disc file, is stored in the HD 2 for every image.

Figure 4A:
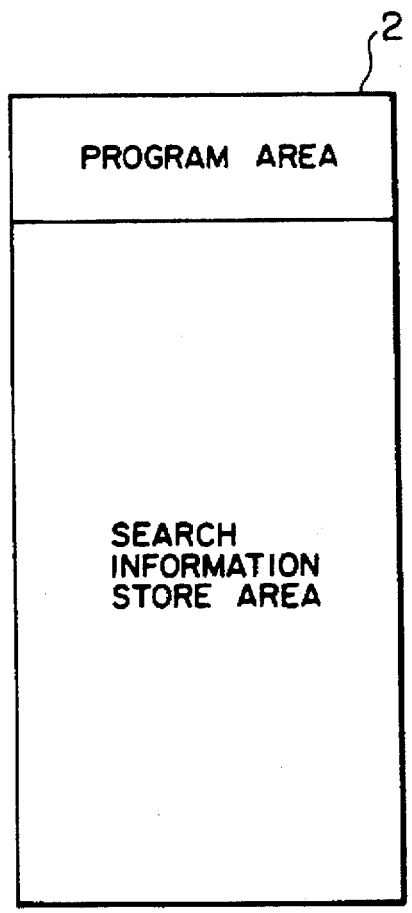
FIG. 4A is a memory map diagram of a hard disc.
Figure 4B:
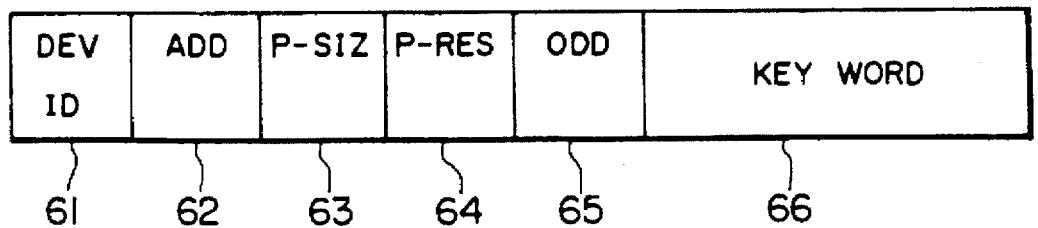
FIG. 4B is a format diagram of a search information record.

In the foregoing construction, the search information has such a construction as shown in, e.g., FIG. 4B. Since the formats of the search information of both media are common, DEVID indicative of the kind of medium is stored into a search information field 61. In the case of the optical disc, the medium number and the physical address in the optical disc are stored into a field 62. In the case of the microfilm, the cartridge number and frame number are stored into the field 62. A key word as an ID (identification name) of the file to be searched is stored into a field 66. The operator of the work station 10 can designate a desired file by the key word 66 mainly.

Figure 1B:
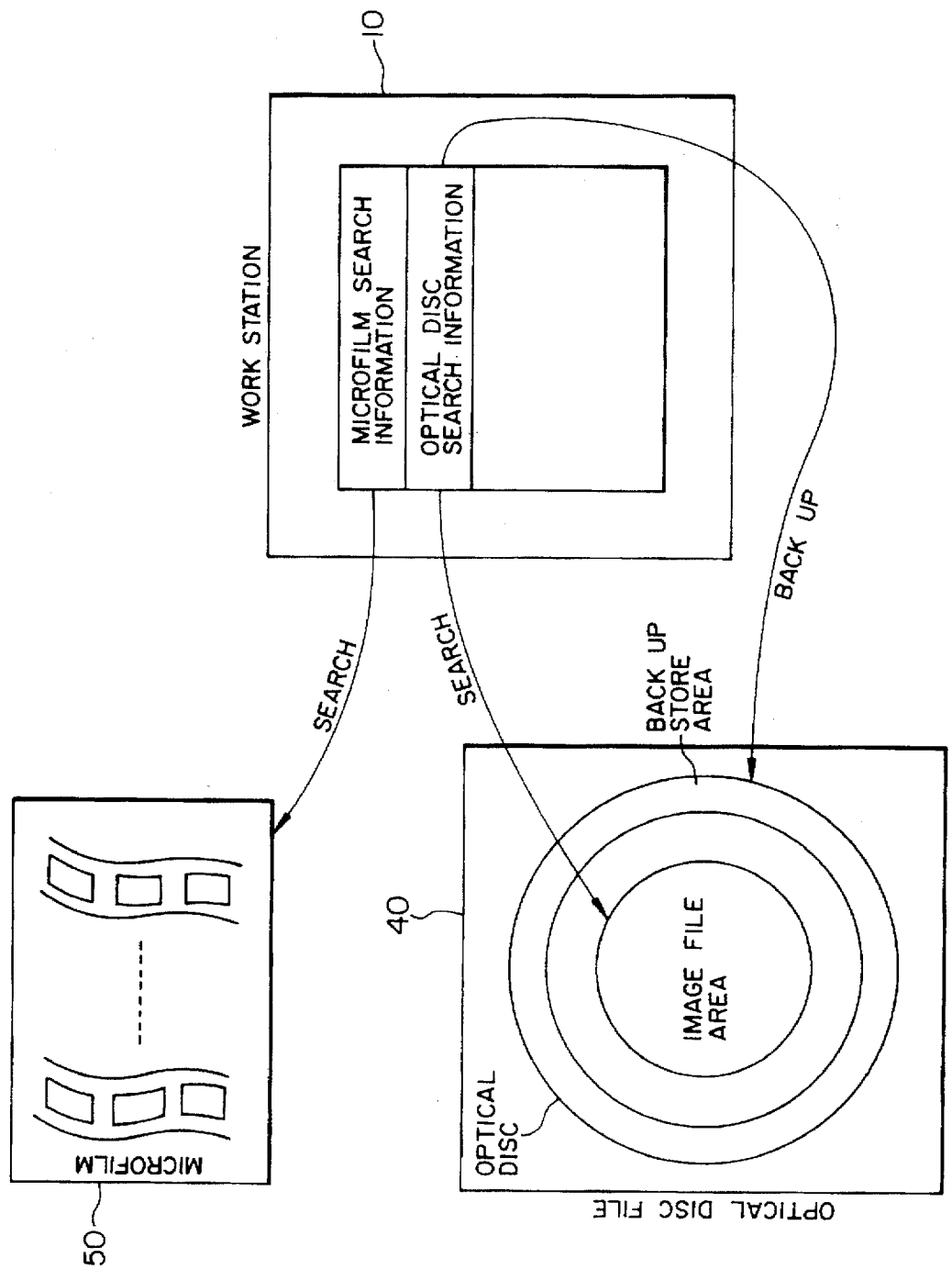

(b) FIG. 1B shows a construction of a composite image filing system of another embodiment. This filing system comprises the optical disc file 40 having functions to read and write images, the microfilm file 50 to read the images from the microfilms, and the work station 10. The work station 10 has therein, for example, the hard disc (HD) 2 as the memory means. The search information 10 to search a desired file, namely, the search information having the format which is common to both of the microfilm file and the optical disc file is stored in the HD 2 for every image. Further, each of the optical discs in the optical disc file 40 is provided with areas to back up the search information in the HD 2 corresponding to the image file stored in the optical disc.

In the construction shown in FIG. 1B, the search information has such a construction as shown in, e.g., FIG. 4B. This format is shown as an example in the case where the formats of the search information of the media of the microfilm and optical disc are common. In general, since the size of image file is large, an amount of search information in the HD 2 is also large. Since the copies of such a large amount of search information are stored into the backup storing areas in the optical disc, if anything should happen, safety is assured because of the backup. In addition, since the backup is provided, the search information in the HD 2 can be easily temporarily erased.

(c) FIG. 1C shows a construction of a composite image filing system of still another embodiment. This filing system comprises optical disc file 40 having the functions to read and write images, the microfilm file 50 to read the images from the microfilms, and the work station 10. The work station 10 has therein, for example, the hard disc (HD) 2 as the memory means. The search information to search the file, namely, the search information having the format which is common to both of the microfilm file and the optical disc file is stored in the HD 2 for every image. Further, in the work station 10, the backup of the search information in the HD 2 corresponding to the microfilm image files is performed by, e.g., a floppy disc (FPD) 3.

In the foregoing construction, the search information has such a construction as shown in, e.g., FIG. 4B. This format is shown as an example in the case where the formats of the search information of the media of the microfilm and optical disc are common. In general, since an amount of image files of the microfilms is large, the search information in the HD 2 is also large. Since the copies of the search information of such a large amount of microfilms are stored in the FPD 3, if anything should happen, safety is assured because of the backup. In addition, since the backup is provided, the search information in the HD 2 can be easily temporarily erased.

Figure 1D:
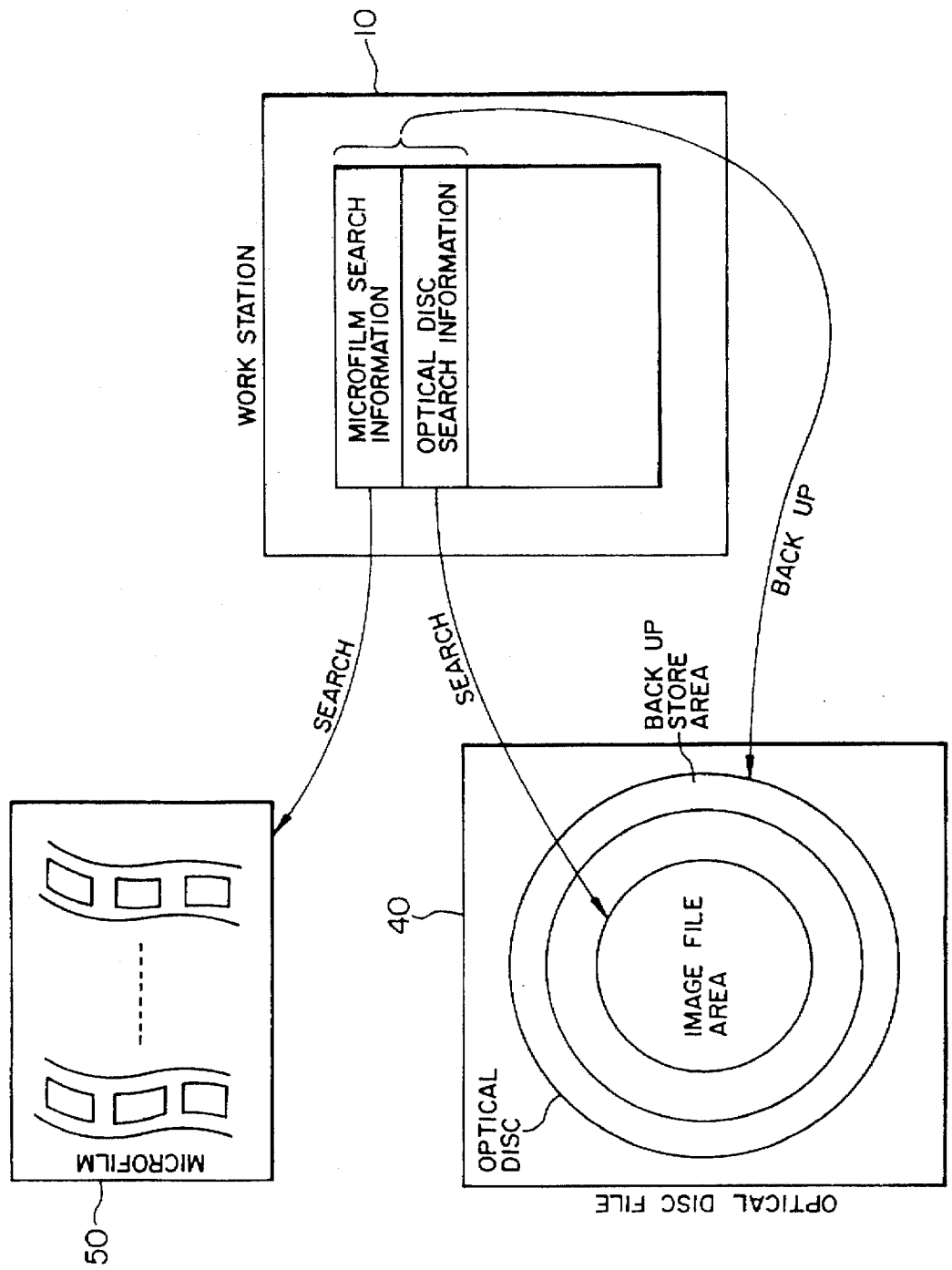

(d) FIG. 1D shows a construction of a composite image filing system of still another embodiment. This filing system comprises the optical disc file 40 having functions to read and write images, the microfilm file 50 to read the images from the microfilms, and the work station 10. The work station 10 has therein, for example, the hard disc (HD) 2 as the memory means. The search information to search a desired file, namely, the search information having the format which is common to both of the microfilm file and the optical disc file is stored in the HD 2 for every image. Further, a predetermined optical disc is provided with areas to back up all of the search information (search information of both of the image files in the microfilms and optical discs).

With the foregoing construction, the search information has such a construction as shown in, e.g., FIG. 4B. Thus format is common for the media of the microfilm and optical disc. In general, since an amount of image files is large, the search information in the HD 2 is also large. Since the copies of such a large amount of search information are stored into the backup storing areas in the optical disc, if anything should happen, safety is assured because of the backup. In addition, since the backup is provided, the search information in the HD 2 can be easily temporarily erased. Since the optical disc has a large capacity, it can assure the backup of the search information of the image files in the microfilms and optical discs. When the backup once been stored into the optical disc, it is not erased; therefore, the contents of all of the image files can be searched. The foregoing predetermined optical disc may be an optical disc to record the image files or an optical disc which is used for only the backup may be also provided and the backup may be stored into this optical disc.

(e) FIG. 1E shows a construction of a composite image filing system of still another embodiment. This filing system comprises one or a plurality of optical disc files 40 having functions to read and write images, the microfilm file 50 to read the images from the microfilms, and the work station 10. The work station 10 has therein, for example, the hard disc (HD) 2 as the memory means. The search information to search a desired file, namely, the search information having the format which is common to both of the microfilm file and the optical disc file is stored in the HD 2 for every image. Further, a predetermined optical disc 40 is provided with the areas to back up all of the search information (the search information of both image files in the microfilms and optical discs).

With the foregoing construction, the search information has such a construction as shown in, e.g., FIG. 4B. This format is shown as an example in the case where the formats of the search information of both media of the microfilm and optical disc are common. In general, since an amount of image files is large, an amount of search information in the HD 2 is also large. Since the copies of such a large amount of search information are stored into the backup storing areas in the optical disc, if anything should happen, safety is assured because of the backup. In addition, since the backup is provided, the search information in the HD 2 can be easily temporarily erased. On the other hand, since the optical disc has a large capacity, it can assure the backup of the search information of the image files in the microfilms and optical discs. When once the backup has once been stored into the optical disc, it is not erased. Therefore, the contents of all of the image files can be searched. The foregoing predetermined optical disc may be an optical disc to record the image files or an optical disc which is used for only the backup may be also provided and the backup may be stored into this optical disc.

Figure 1F:
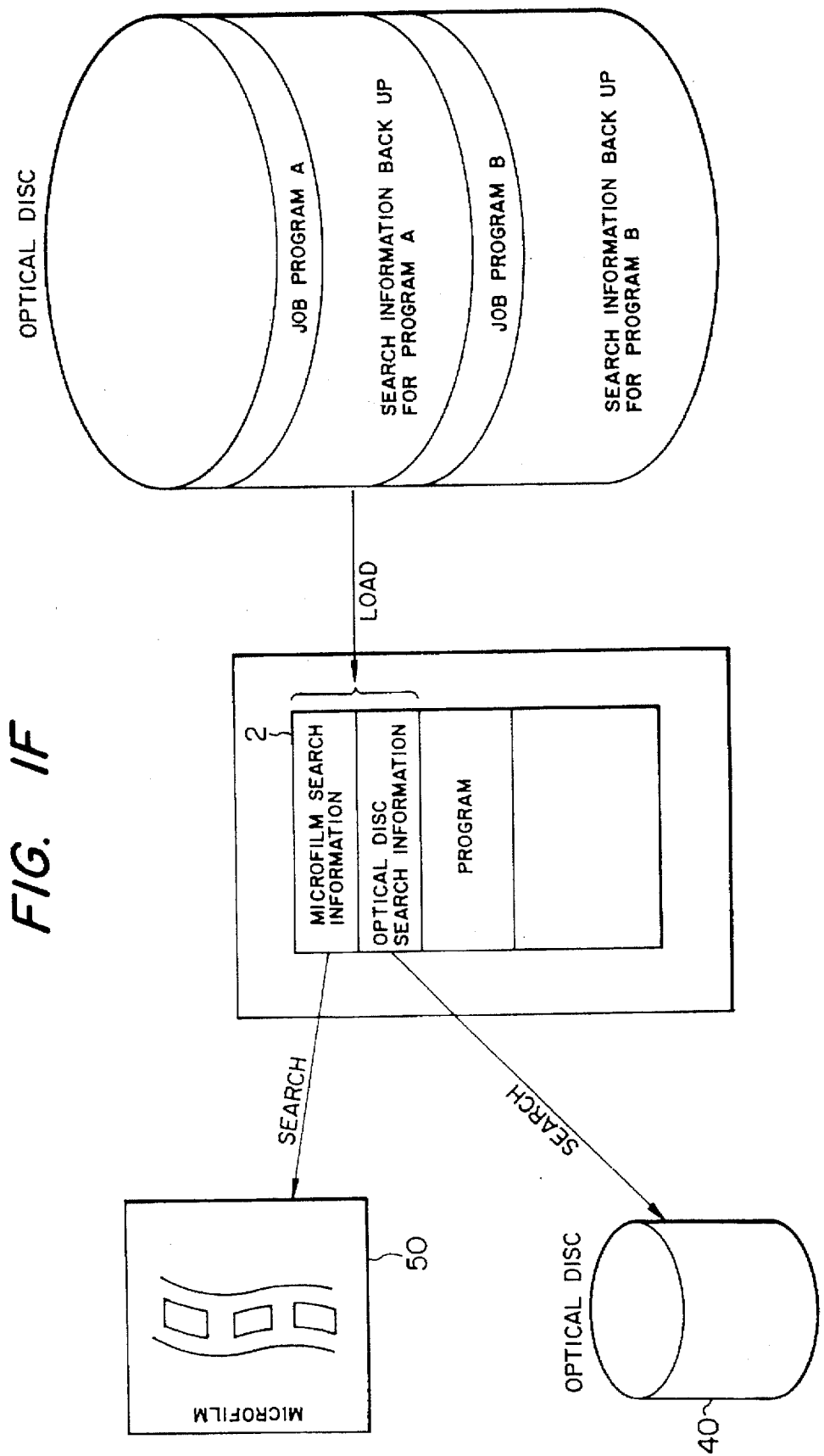

(f) FIG. 1F shows a construction of a composite image filing system of still another embodiment. This filing system comprises one or a plurality of optical disc files 40 having functions to read and write images, the microfilm file 50 to read the images from the microfilms, and the work station 10. The work station 10 has therein, for example, the hard disc (HD) 2 as the memory means. The search information to search a desired file when the JOB program is executed, namely, the search information having the format which is common to both of the microfilm file and the optical disc file is stored in the HD 2 for every image. Further, a predetermined optical disc different from the optical disc 40 is provided with the area to back up all of the search information (the search information of both image files in the microfilms and optical discs). The backup file of the search information registered by the execution of, e.g., the preceding JOB program is stored in these areas as the systematized format on a program unit basis. Only the search information to be used can be developed in the hard disc.

With the foregoing construction, the search information has such a construction as shown in, e.g., FIG. 4B. This format is shown as an example in the case where the formats of the search information of both media of the microfilm and optical disc are common. The backup file is stored into the backup areas as the format which is systematized as shown in, e.g., FIG. 18. When the JOB program is executed by the work station 10, the backup file is first accessed in the HD 2 and only the search information to be used for this JOB program is developed in the HD 2.

(g) FIG. 1G shows a construction of a composite image filing system of still another embodiment. This filing system comprises the optical disc files 40 of a plurality of drives (e.g., eight drives) having functions to read and write images, the microfilm file 50 to read the images from the microfilms, and the work station 10. The work station 10 comprises an operation unit such as, e.g., a keyboard and the like to perform the processes of the image files in the microfilms and optical discs and the like and, for example, the hard disc (HD) 2 as the memory means, and the like. The search information to search desired image files in the microfilm files and optical disc files is stored into the HD 2 for every image.

With the foregoing constitution, the search information stored in the HD 2 is preserved as the backup file into the optical disc in accordance with the following priorities.

In the composite image filing system in which the optical disc can record not only the image files but also the backup file of the search information, the work station 10 preserves the backup file of the search information into the optical disc of the drive nearest to the operation unit among a plurality of drives in which the optical discs are loaded.

In the composite image filing system in which there are two types of optical discs and the backup file is preserved into only the optical disc which is used for only the backup between these two optical discs, if there exist some drives into which no optical disc is loaded, the work station 10 instructs the drive nearest to the operation unit among those drives so as to load the backup dedicated optical disc. If all of the drives are in the operative mode, the work station 10 instructs to replace the drive nearest to the operation unit.

The embodiment according to the present invention will now be described further in detail hereinbelow with reference to the drawings. The present invention may be embodied in a single apparatus or a system composed of a plurality of such apparatuses. It is also obvious that each component section in the invention may be a single apparatus, or another system or single apparatus which communicates through an LAN or public line. It is also apparent that the term "image(s)" used in this invention may be any of characters, graphics, and pictures, or may be a combination thereof.

(External view of the embodiment)

Figure 2A:
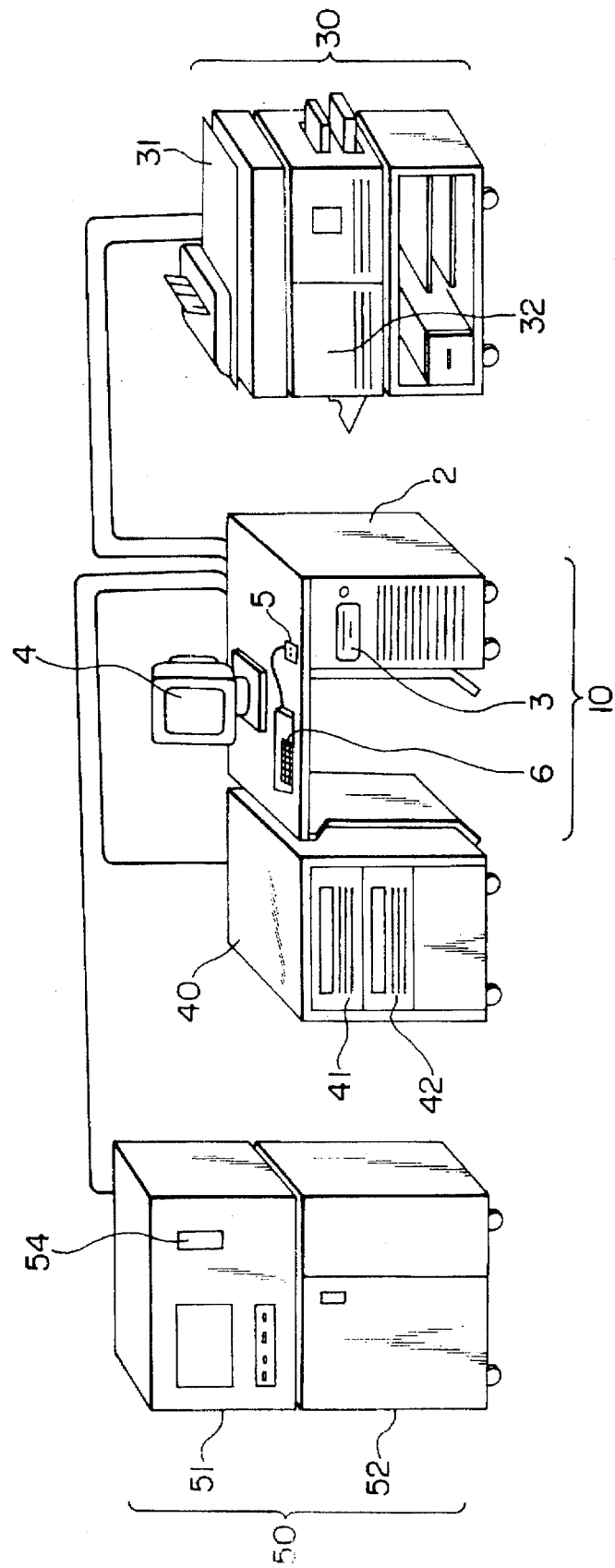
FIG. 2A is an external view of a composite image filing system of an embodiment of the invention.

FIG. 2A shows an external view of the embodiment. In FIG. 2, this embodiment mainly comprises the work station 10, a reader/printer unit 30, the optical disc file 40, the microfilm file 50, and the like.

The work station 10 comprises: auxiliary memory means such as the hard disc (hereinafter, abbreviated to the HD) 2, floppy disc (FPD) 3, or the like; a CRT 4 by which a high precise image can be directly seen; a keyboard (KBD) 6; a pointing device (PD) 5; a controller 1 (see FIG. 3); and the like.

The optical disc file 40 is the image file having a recording medium such as optical disc, magnetooptic disc, or the like and permits one to write and read out a large amount of image information. The optical disc 40 has an optical disc drive (OD) 41 which is always provided, and an optical disc drive 42 for extension. The term "image file(s)" in this embodiment obviously includes not only pure image but also character information since the work station (WS) 10 is intended to have the word processing function as well.

The microfilm file 50 comprises a microfilm scanner (hereinafter, abbreviated to an MS) 51 and a microfilm autochanger (hereinafter, abbreviated to an MA) 52. The MS 51 converts the image information recorded in a microfilm into the electric signal by an image pickup device such as a CCD or the like of about 36000 bits. The MA 52 automatically exchanges the cartridge of the microfilm.

The reader/printer unit 30 comprises an image scanner (IS) 31 and an image printer (IP) 32. The IS 31 converts the image information of an original put on an original plate into the electric signal by an image pickup device such as a CCD or the like. The IP 32 consists of a laser beam printer or the like and records the image on a recording material on the basis of the information of the electric signal.

The component elements will now be described further in detail. The CRT 4 displays the image information which was photoelectrically read by the IS 31 and MS 51, the control information of the system, the inputs by the operator, or the like. The CRT 4 may use a color display device so as to process a color video signal. The operation and the like of the system are instructed by operating the KBD 6. The KBD 6 has the functions of word processor, office computer, and the like in combination with the CRT 4. The PD 5 is the pointing device to input coordinate information such as instruction of an icon (picture character) on the display screen of the CRT 4, extraction of a desired area in the screen, and the like. By moving the PD 5, the operator arbitrarily moves the cursor on the CRT 4 in the X and Y directions and can select and instruct the command image on the command menu.

(Constitution of the embodiment)

Figure 2B:
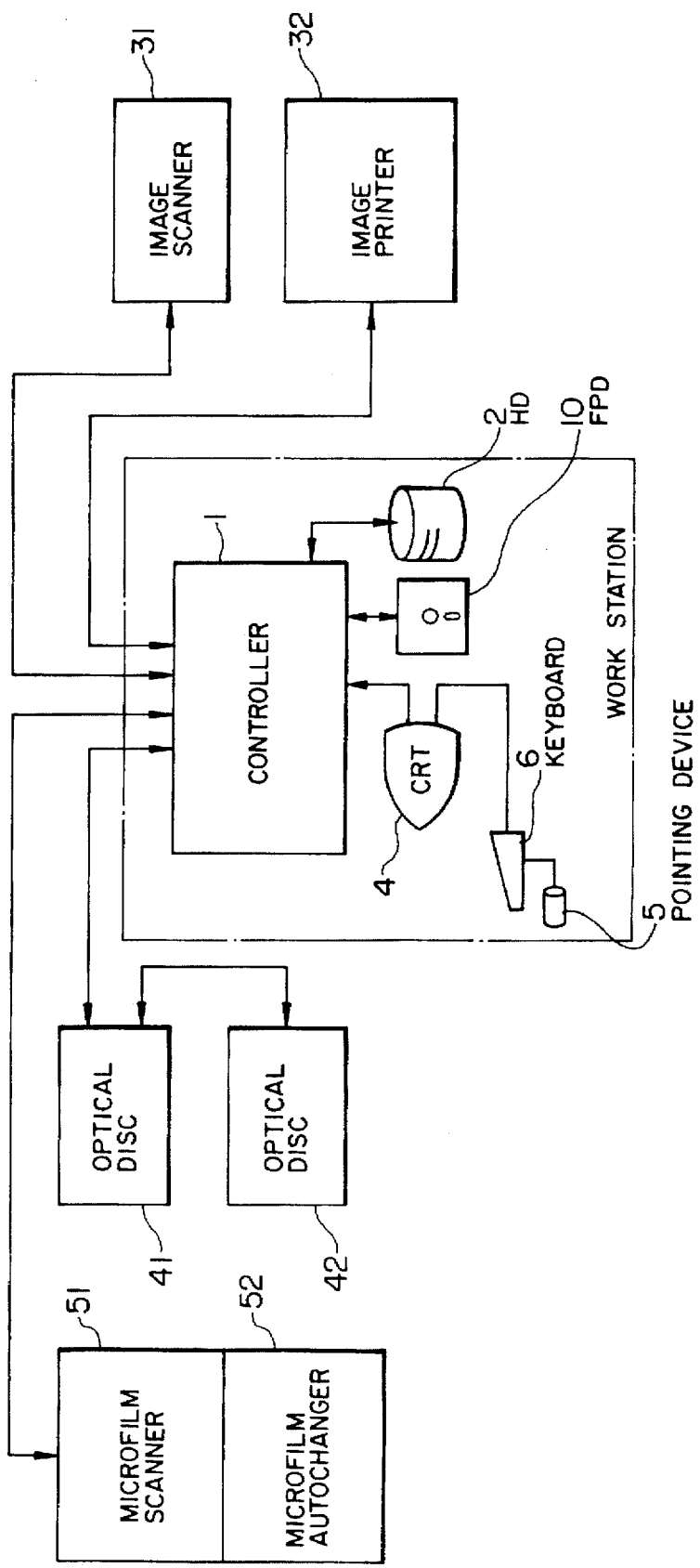
FIG. 2B is a connection diagram of the composite image filing system of the embodiment.
Figure 3:
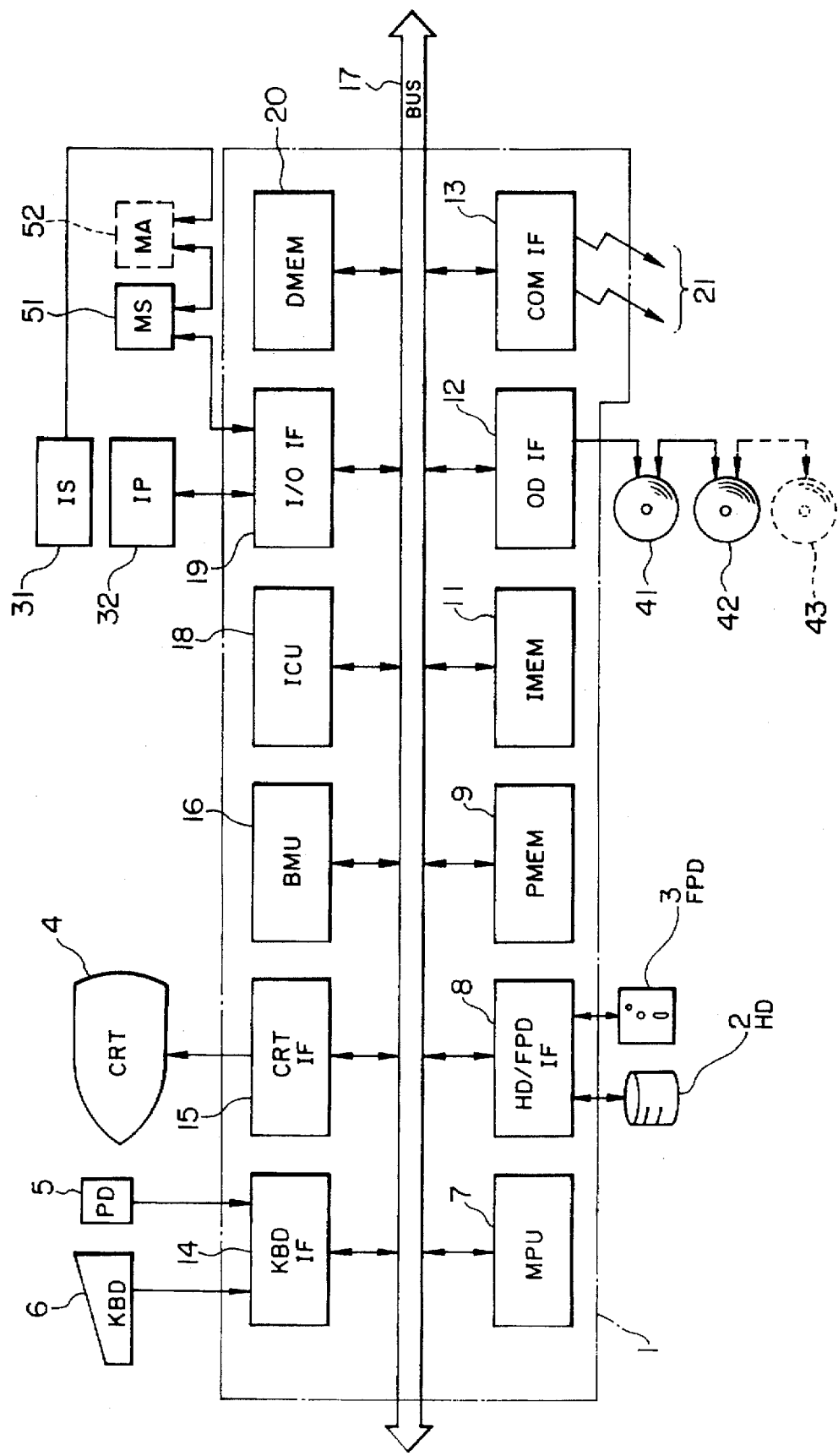
FIG. 3 is a circuit arrangement diagram of a controller.

FIG. 2B is a diagram for explaining the arrangement shown in FIG. 2A from the viewpoint of the signal connection. The work station 10 surrounded by a broken line is the main section and controls the composite filing system of the invention; "work station" is abbreviated to "WS" 10 hereinafter. As previously described in FIG. 2A, the reader/printer unit 30, optical disc file 40, and microfilm file 50 are connected to the WS 10. The HD 2 in the WS 10 is the high speed magnetic disc having a relatively large memory capacity. The HD 2 has the significant role to store the control program in the embodiment, to store the search information to search a desired file, and the like as will be explained hereinafter. Namely, the HD 2 stores the search information of the optical disc file 40 and microfilm file 50 and performs the storage, updating, and the like of the search information in response to a request of the WS 10 as will be explained hereinafter. In place of the hard disc, the HD 2 may be other relatively high speed nonvolatile memory device such as, for example, magnetic bubble memory, wire memory, CMOS memory which is backed up by a battery, or the like. FPD 3 provides the storing area to back up the search information for the microfilm file. Obviously, the FPD 3 also provides the storing area to read a program (IPL) for starting or the like for the WS 10. The WS 10 has a controller 1. FIG. 3 Shows the details of a construction of the controller 1.

Figure 8:
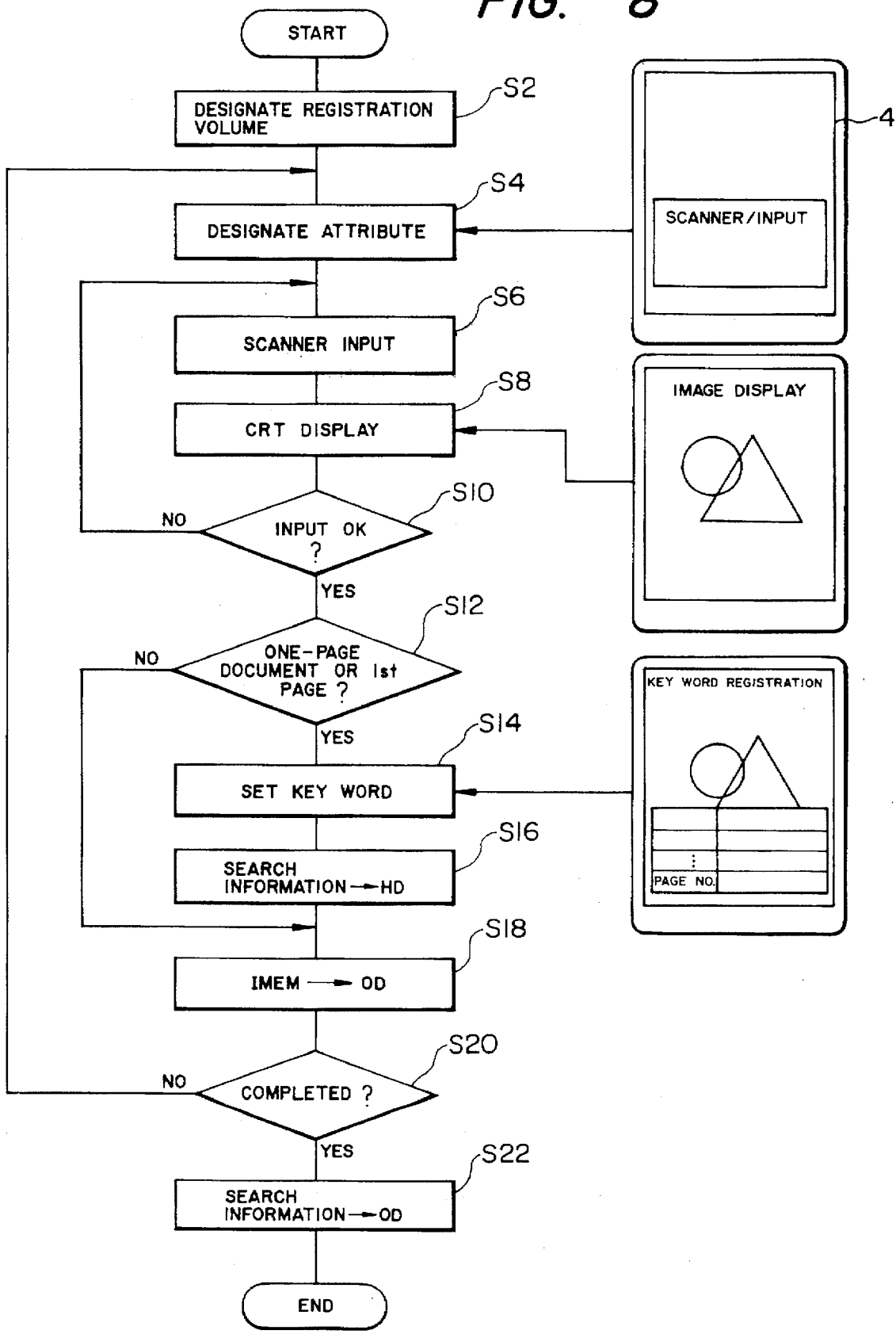

The controller 1 will now be described with reference to FIG. 3. The controller 1 is the main control unit of the WS 10 and has the following construction. Reference numeral 7 denotes a microprocessor (MPU) to control the instructions to the memory and each I/O; 8 is an interface (HD/FPD IF) of the HD 2 or FPD 3; and 9 is a memory (PMEM) to store the program to perform the operation of the WS 10. The PMEM 9 is the program memory constituted by, for example, an RAM or the like. The MPU 7 reads the program into the PMEM 9 from the HD 2 in which the program of the control procedure according to the embodiment as shown in flowcharts in FIG. 8 and the like, which will be explained hereinafter, is stored and executes this program. Numeral 11 denotes a memory (IMEM) to mainly temporarily store the image information. The IMEM 11 is provided to store the input image information from the IS 31, MS 51, and optical disc file 40, to write and output the image information into and from the optical disc file 40 and IP 32, and the like. Numeral 12 denotes an interface (ODIF) of the optical disc file 40. A communication interface (COMIF) 13 is connected to the WS 10 and other apparatus or LAN (local area network) and the like and is an input connecting section for communication which is connected to the LAN, facsimile, host computer, and the like. Numeral 14 denotes an interface (KBDIF) for the KBD 6 and PD 5; 19 is an interface (I/O IF) to control the input of the image information from the IS 31 and MS 51 and to control the output of the image information into the IP 32; and 16 is a bit manipulation unit (BMU) having the functions to operate the bit operation of the image information, namely, to execute the arithmetic operating processes for displaying a multiwindow on the screen of the CRT 4 and for moving the cursor in correspondence to the instruction from the PD 5, to rotate, enlarge, and reduce the image information, and to perform the DMA operation of the information in the PMEM 9 and IMEM 11 with each I/O, which will be explained hereinafter. Numeral 15 denotes an interface (CRTIF) having therein a VRAM (video RAM) to display the image information and 18 is an image compression unit (ICU) to compress and expand the image information. The ICU 18 operates to compress and expand the image information mainly in order to increase the amount of image information to be stored when the information is transmitted and received to and from the ODs 41, 42, and 43 through the IMEM 11 and ODIF 12. A data memory (DMEM) 20 stores the flags and the like which are used by the MPU 7 when the control program is executed. The DMEM 20 may be also provided in the PMEM 9.

(Memory map in the HD 2)

FIG. 4A shows a memory map in the hard disc 2. The content of the memory map consists of a program area and a search information record storing area. FIG. 4B shows a format of the search information record which is stored in the HD 2. Both of the image information stored in the optical disc file 40 as mentioned and the search information corresponding to the images of the respective frames of the microfilms in the microfilm file 50 are stored in the HD 2 (refer to FIG. 5). It should be noted that the search information for the different media of the optical disc file 40 and microfilm file 50 has a common format as shown in FIG. 4B. Since the search information has the common format, the search information for the different recording media can be efficiently easily managed. However, there is no need to limit the invention to the common format, from the viewpoint of integrally managing the image files. Namely, it is essential that the recording media can be distinguished.

The search information record format shown in FIG. 4B will now be described. As shown in the diagram, this format is divided into six fields. An identification mark (DEV-ID) indicating in which one of the optical disc file 40 and microfilm file 50 the image corresponding to the search information record exists is set into the field 61. In this embodiment, the microfilm image is defined as "1" and the optical disc image is defined as "0". Address information ADD in the medium in which the image corresponding to the search information record is recorded is set into the field 62. In the case of the optical disc, the address information ADD includes the drive number, absolute address in the optical disc, and the like. In the case of the microfilm, the cartridge number, frame number, and the like of the microfilm file are stored as the ADD.

The size (P-SIZ) of the image corresponding to the search information record is set into a field 63 and shows the discrimination data with regard to, for example, whether the output image size is A4, A3, or the like. Resolution information P-RES of the image corresponding to the search information record is set into a field 64. In this embodiment, when the image information is input (registered), either one of 400, 300, and 200 dpi is designated as the resolution. Various kinds of relevant information ODD such as compression ratio, discrimination information of positive/negative, and the like concerned with the image corresponding to the search information record is set into a field 65 as necessary. Key word information (KW) of the image file corresponding to the search information record is set into the field 66. The key word information KW may be described by any of numerals, characters, and symbols.

In the case where the operator stores a desired image into the optical disc file 40, the search information records are input and written into the HD 2 by use of the KBD 6 of the work station 10 in correspondence to this image. On the other hand, in the case of recording a large number of images into the optical disc or microfilm, the search information is written into the floppy disc using a personal computer or the like in accordance with a predetermined format and the search information in the floppy disc is transferred and stored from the FPD 3 into the HD 2. The search information may be also read from a scanner. (Relation between the search information in the respective storing media)

Figure 5:
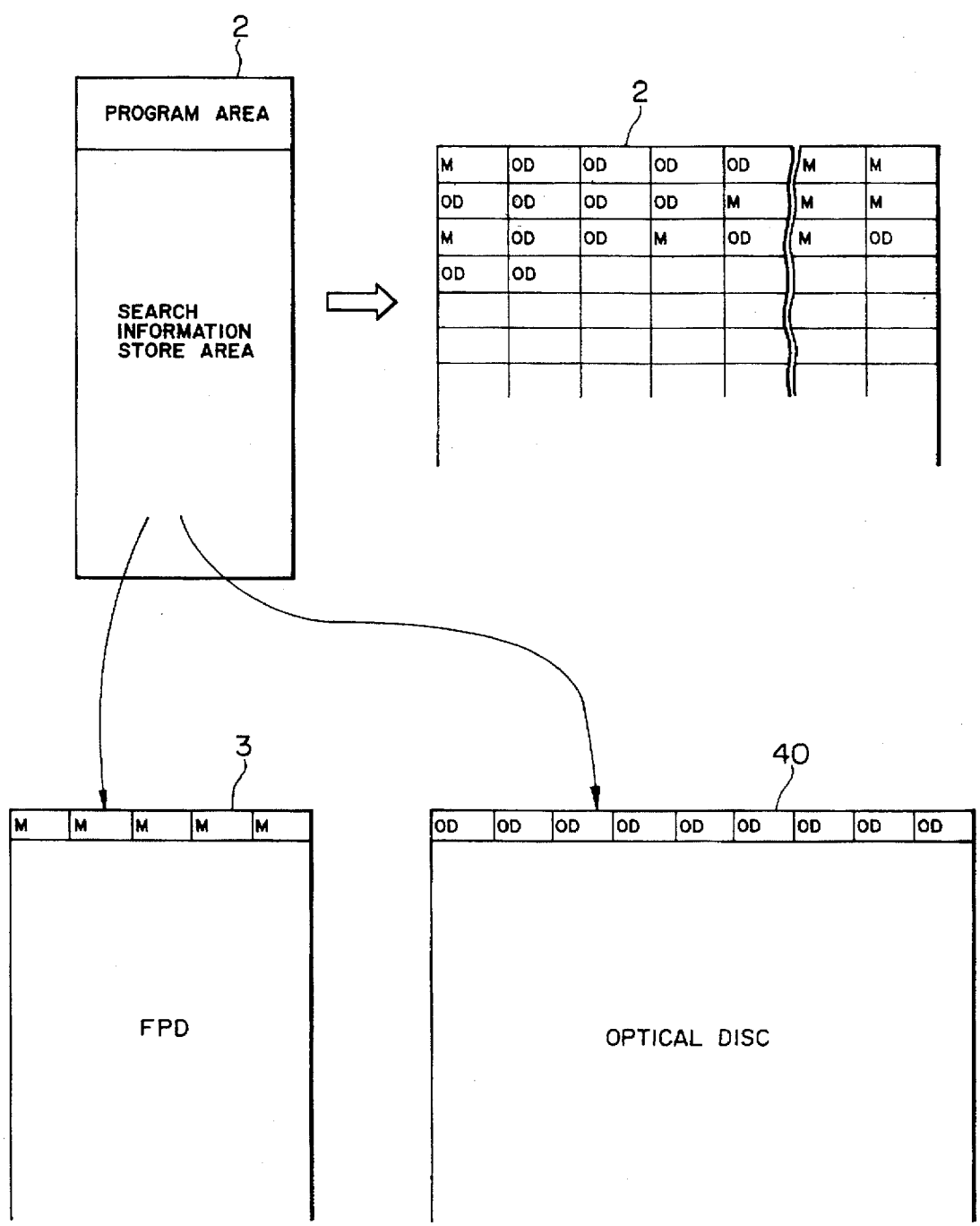
FIG. 5 is a diagram for explaining the relation among a file, search information, and a backup file.

The search information records for the respective images stored in the optical disc file 40 and microfilm file 50 are mixedly stored in the HD 2 as shown in FIG. 5 in accordance with the format shown in FIG. 4B. In FIG. 5, "M" denotes the microfilm and "OD" indicates the optical disc file. A method of backing up the search information record in the HD 2 is shown in FIG. 5. Namely, the backup of the search information record of the microfilm is stored into the floppy disc (FPD) 3. The backup of the search information record of the optical disc file 40 is stored into the optical disc drive. Different from the individual backup method of each recording medium shown in FIG. 5, another embodiment of the backup method whereby all of the search information records in the HD 2 are backed up in an optical disc which is used for only the backup is also disclosed (this method will be explained in conjunction with FIG. 17 and the subsequent drawings.)

The embodiment will be described hereinbelow in accordance with the following order. (1) Description of the operation to register the images from the IS 31 or MS 51. (2) Description of the operation to register the image in association with the exchange of media from the microfilm to the optical disc. (3) Description of the operation to restart or reconstruction based on the backup method in FIG. 5. (4) Description of the backup method in the system equipped with the backup dedicated optical disc and the operation for reconstruction.

(Data construction in the optical disc)

Figure 6:
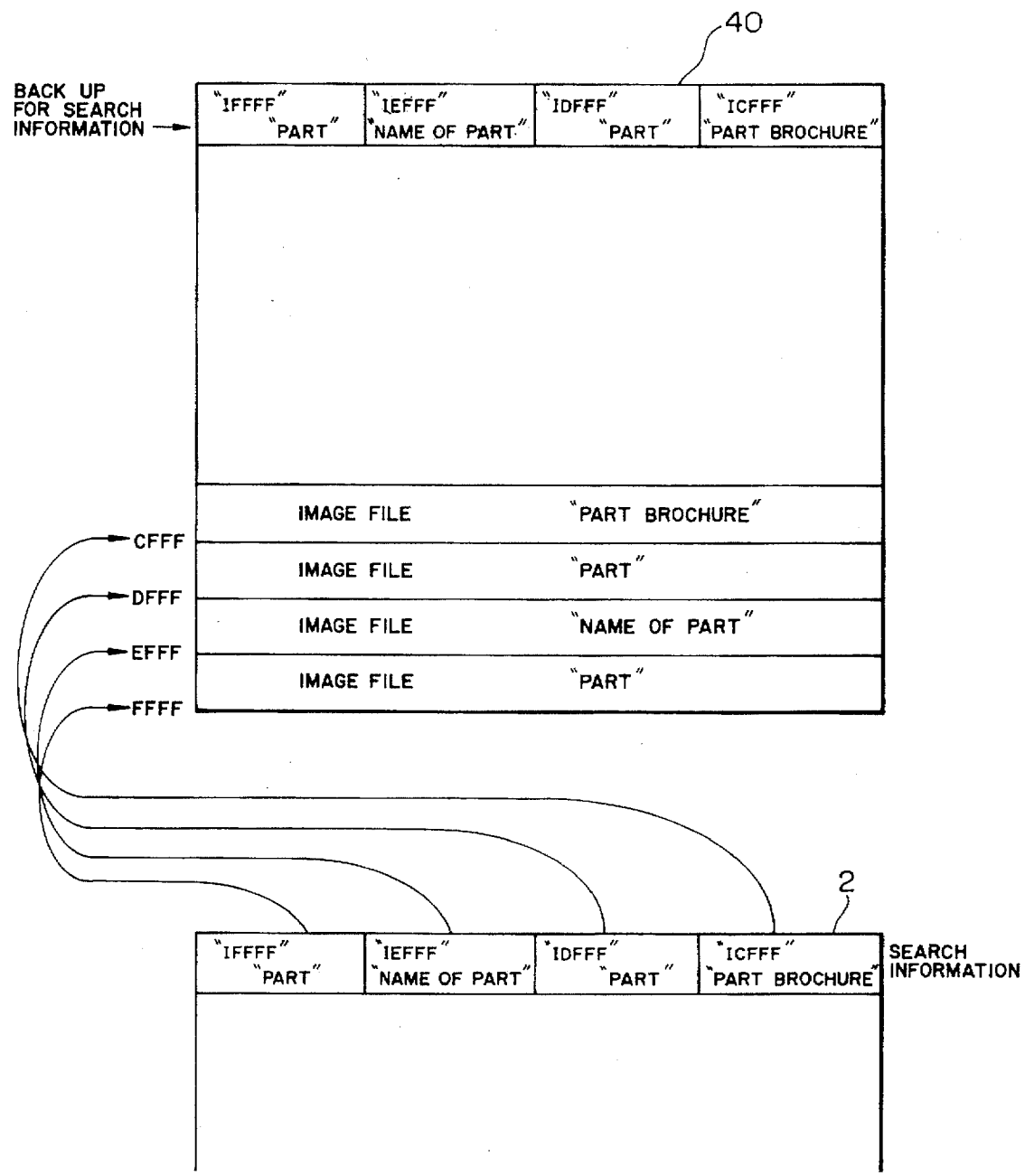
FIG. 6 is a diagram for explaining the relation between search information and an image file in an optical disc file.

Shown in FIG. 5 is the relation between the search information in the media. There is also the relation between the image file in the optical disc file 40 and the search information record as shown in FIG. 6. In FIG. 6, for example, four image files are stored into the optical disc file 40. The key words 66 of the four image files are "part", "name of part", "part", and "part brochure", respectively. The ADD fields 62 in those image files are "1FFFF", "1EFFF", "1DFFF", and "1CFFF", respectively. The number of digits of the ADD 62 is set to five for convenience and the MSD denotes the drive number of the optical disc file 40. Namely, the drive number is "1" in the example of FIG. 6. In FIG. 6, the addresses in the optical disc file 40 are set in accordance with the order from the lower address to the higher address in the direction from the upper portion to the lower portion in the diagram. In general, since the low address has high reliability, the significant data, e.g., search information record or the like is stored in the low address. Although two image files having the same key word names ("part") exist in FIG. 6, this means that the image file in the address "1FFFF" is subjected to, e.g., an image process and registered as a new image file having the same key word 66.

The optical disc in this embodiment is what is called a WORM (write once, read mostly) type optical disc. Since the old file cannot be erased, image files having the same key word exist. The point that the new and old files mixedly exist meets the large memory requirement and results in the advantage of the optical disc. Namely, the content of the files can be searched by the search information record. In general, a desired image file in the optical disc is searched in the method whereby all of the search information records in the HD 2 or optical disc are read and the read search information records are sequentially displayed on the CRT 4 and the operator selects the desired search information record by observing the search information records displayed.

(Registration of the image from the IS 31)

Figure 7:
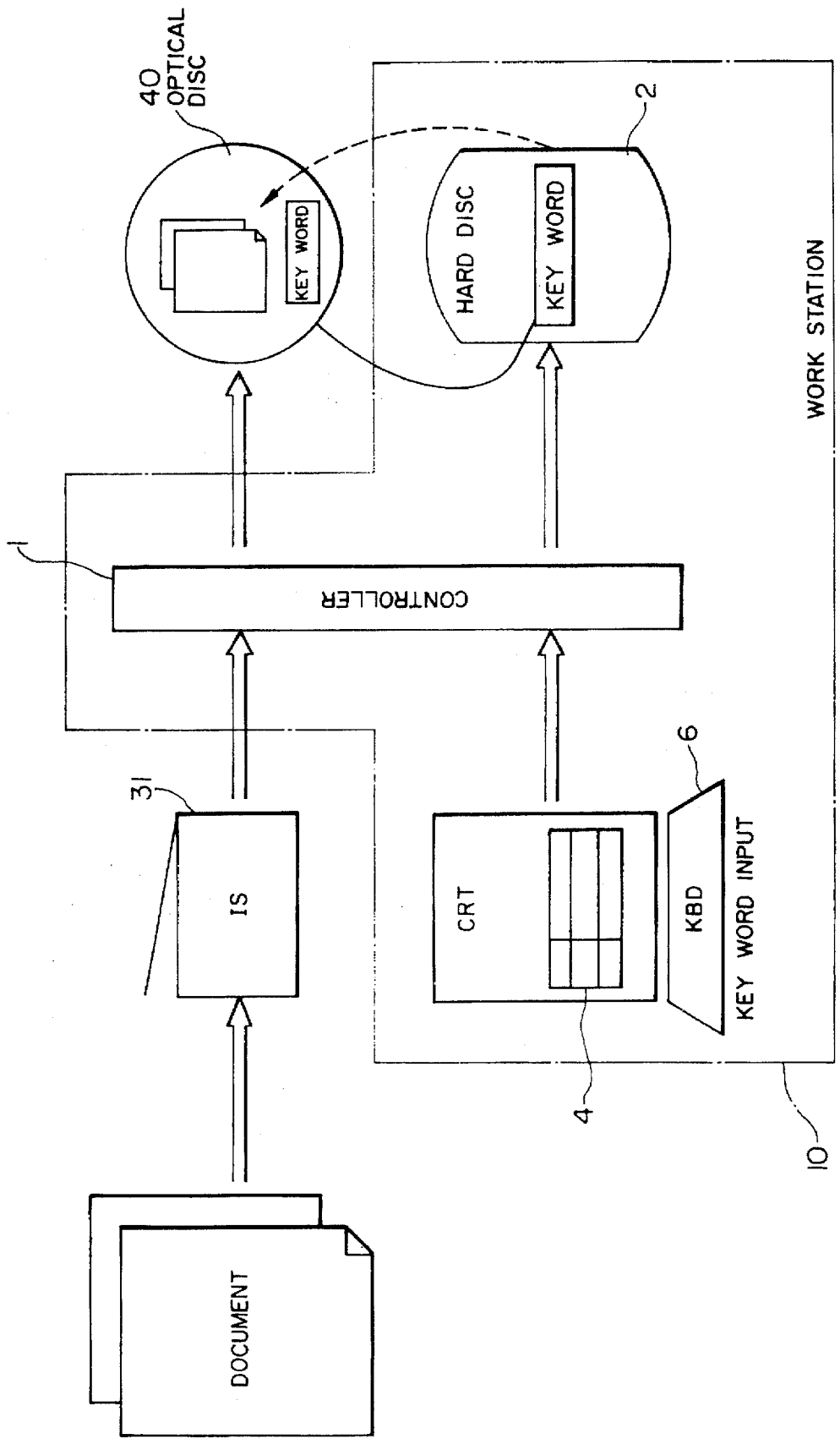
FIGS. 7 and 8 are a conceptional diagram of the operation to register an image file from an image scanner and a control flowchart for this operation, respectively.

FIG. 7 is a diagram for explaining the concept of the operations when the document image is read by the IS 31 and stored and registered into the optical 1 disc file 40. Referring to FIG. 7, the document information read by the IS 31 is temporarily stored into the controller 1 (i.e., IMEM 11). The operator registers the key word 66 input through the KBD 6 into the HD 2 and stores the image into the optical disc file 40 while observing the CRT 4. The key word may be also input from the image scanner IS. In this case, the backup of the search information in the HD 2 is stored into the optical disc file 40.

The outline when the image file from the IS 31 is registered is as described above. The control procedure for the registration will now be explained with reference to the flowchart in FIG. 8. Examples of the display screen on the CRT 4 are properly shown in FIG. 8 as necessary together with the steps in the flowchart.

After the image original to be registered into the optical disc was set into the IS 31, the registration volume is designated in step S2. The registration volume is the ID (identification name) and the like of the optical disc. In the next step S4, the image reading mode (attribute of the image file), for example, resolution (either one of 200 dpi, 300 dpi, and 400 dpi) and the original size (A3, A4, B3, or B4) are instructed through the menu screen by use of the PD 5 in accordance with the instructions which are displayed on the CRT 4. In step S6, the image is read out by the IS 31 and temporarily stored into the IMEM 11 in the WS 10 in accordance with the attribute designated. The data stored in the IMEM 11 is converted into the display data by the MBU 16 in step S8 and thereafter, it is stored into the VRAM in the CRTIF 15 and displayed on the CRT 4. The operator observes the display image and checks to see if it has been correctly read or not. If the image data has been correctly read, a check is made in step S12 to see if the image data which has just been read is the one-page document or the first page among a plurality of pages. The discrimination can be easily performed by the instruction of the operator or from the attribute designated in step S4. The reason why this discrimination is performed is to set the key word 66 in the case of the first page. If YES in step S12, namely, the image data is the one-page document or the first page among a plurality of pages, the key word 66 is set in step S14 an the input key word 66 is temporarily stored into the DMEM 20. As mentioned above, the key word 66 is input by use of the PD 5 or KBD 6 while observing the CRT 4. After the key word 66 was stored into the DMEM 20, it is converted into the format shown in FIG. 4B together with the other information. The search information record is written into the HD 2 in step S16. Then, step S18 follow. If NO in step S12, namely, when the image data is none of the one-page document and the first page, step S18 directly follows step S12. After completion of the storage and the like of the search information record into the HD 2, the WS 10 is made operative by the end icon using the PD 5. In step S18, the image data temporarily stored in the IMEM 11 is written into the optical disc through the ICU 18 by way of the ODIF 12.

The foregoing operations are repeated until the processes for all pages are completed (step S20). After completion of the processes for all pages, the search information record of the relevant image original is written into the optical disc file 40 as the backup in step S22. At this time, the search information record for the registration and backup of the image file has been recorded in the optical disc file 40 as shown in FIG. 6. Therefore, even if the search information record of the image data stored in the HD 2 is broken because of some trouble, the same search information record exists in the optical disc file 40; therefore, the broken search information record can be easily reconstructed.

As the other information which is added to the key word 66 in the search information record, the following information is added to the head of the search information record on the basis of the information which is obtained from the conversation between the WS 10 and the operator and the information which is derived from the optical disc. (Namely, the information regarding whether the image data is read from the optical disc or microfilm; the address information indicative of the memory location in the optical disc where the image data is stored; the size information such as A4, A3, etc.; the resolution information; the information indicative of whether the image data has been compressed by the ICU 18 or not; the information representative of an amount of information stored in the optical disc, and the like; the information indicative of the negative information or positive information.)

(Registration from the optical disc)

The registration from the IS 31 has been explained above. However, the case where the image is registered from the optical disc in which it has already been written as mentioned above is also considered. In this case, there is the situation in which the key word 66 is written into the FPD or the like similarly to the writing of the image into the optical disc. In such a situation, in place of inputting the image data from the IS 31 in step S6 in FIG. 8, the image is sequentially read from the relevant optical disc and the search information is read out of the FPD 3 in parallel with the reading operation of the image. Each time the image and the search information are read, it is sufficient to set the key word 66, to register the search information into the HD 2, and to back up the search information into the optical disc.

(Registration of the microfilm file)

Figure 9:
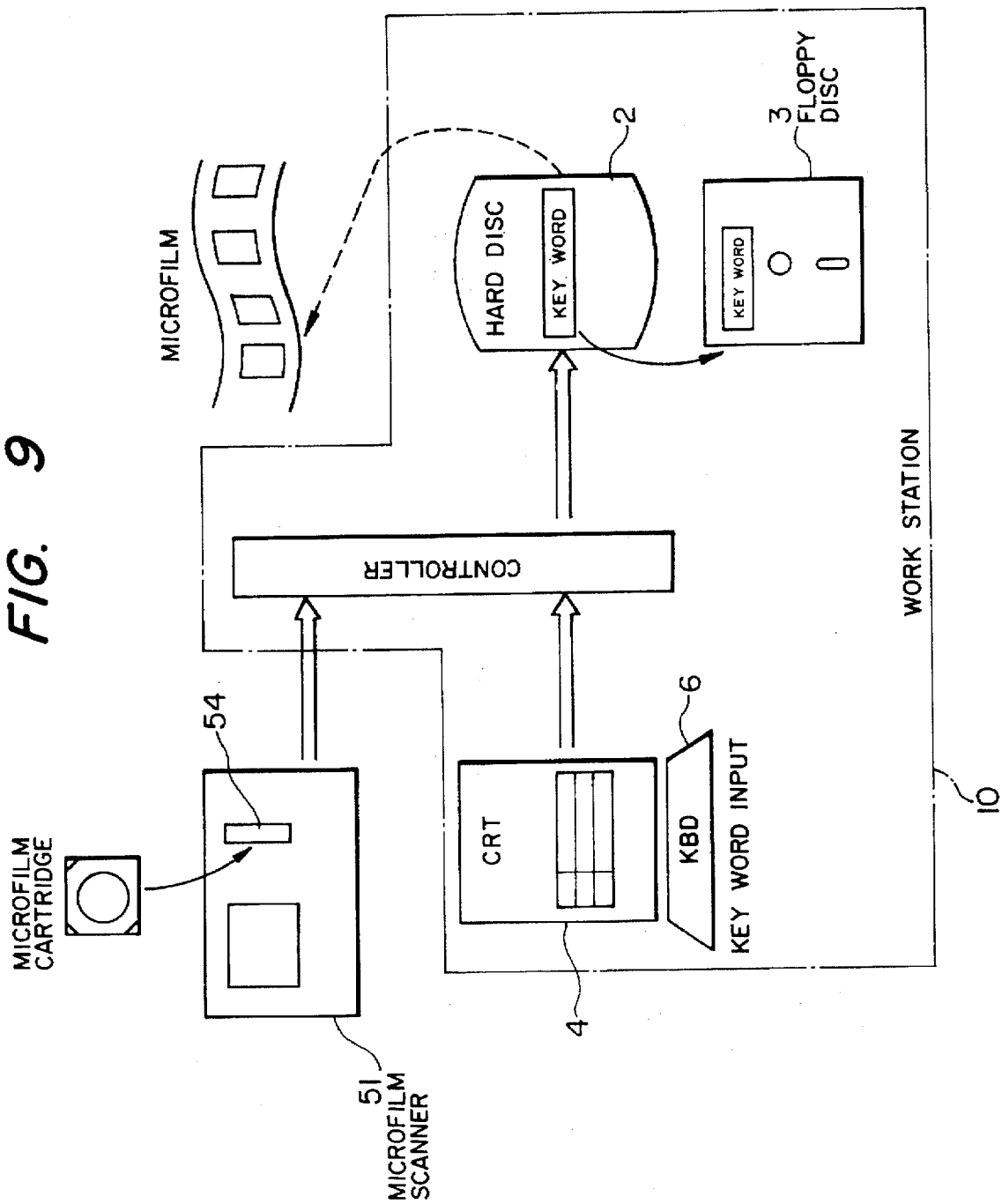
FIGS. 9 and 10 are a conceptional diagram of the operation to register an image file from a microfilm scanner and a control flowchart for this operation, respectively.

In general, the registration of the microfilm means that the microfilm image which has already been recorded as the film is read by the MS 51 and the search information record including the cartridge number and frame number and the like is created and registered into the HD 2. FIG. 9 shows an outline of the operations in this case. This embodiment is characterized in that the search information record is registered into the HD 2 and the search information record for the backup is also stored into the FPD 3.

Figure 10:
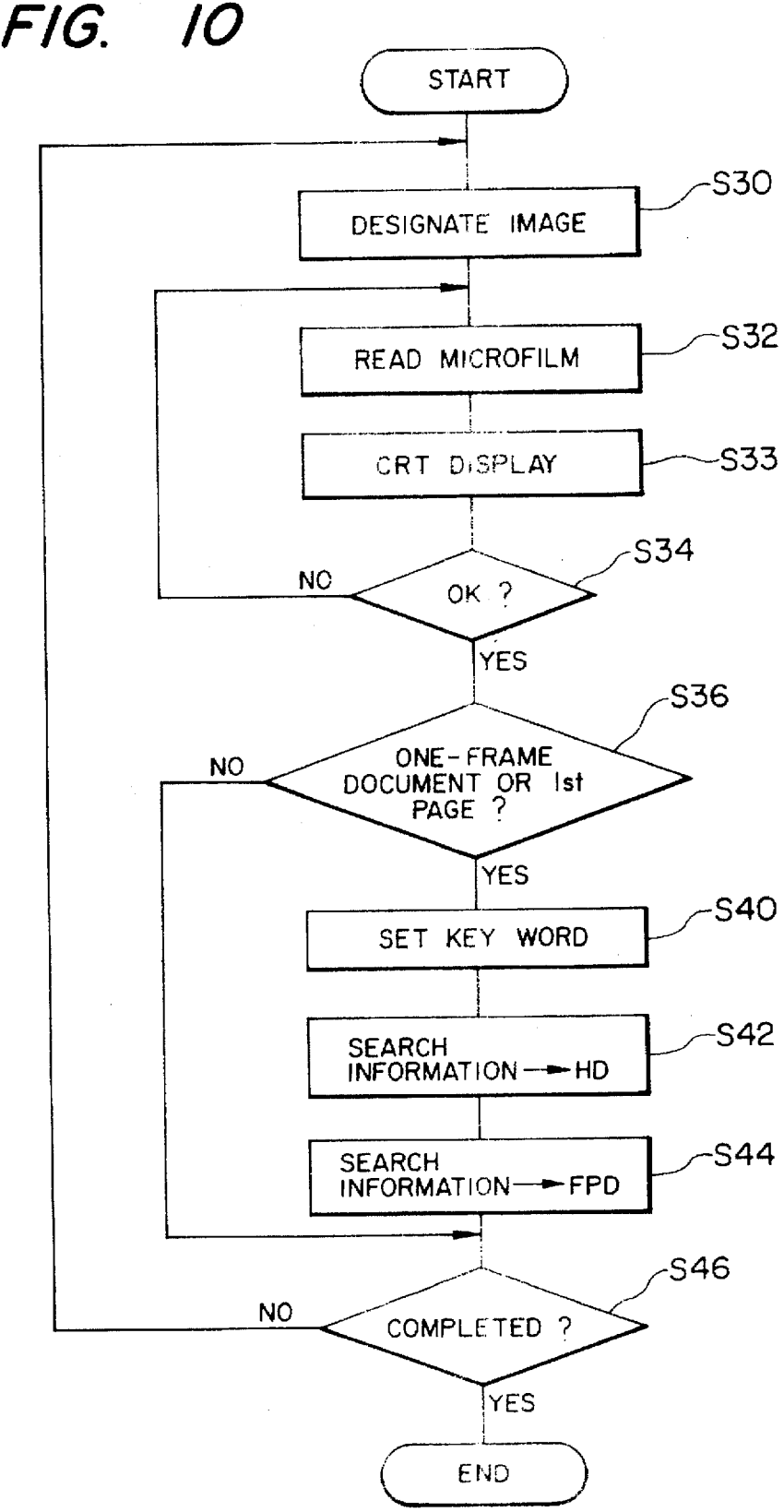

FIG. 10 is a flowchart showing a control procedure for registration of the microfilm. The operations of the microfilm file are classified into two cases: where the operator first sets the microfilm file into a loading unit 54 for every cartridge as shown in FIG. 9, thereby allowing the image to be read; and where the cartridge is automatically selected by using the microfilm autochanger (MA) 52. Different from the optical disc, in the registration of the microfilm file, since the frame number in the microfilm is set to the absolute address, the cartridge number, frame number, and the like are input to the ADD 62 to be added to the search information record and the search information record is constituted. In addition, since the microfilm file is the sequential file, if one search information record is given to the microfilm of a plurality of continuous frames having the same key word 66, the area in the HD 2 can be reduced.

The control procedure in the case where the MA 52 is not used will be described with reference to FIG. 10. First, the microfilm cartridge in which the image information whose key word 66 should be registered exists is set into the loading unit 54 and the image reading mode (image attribute) is designated in step S30 similarly to the input by the image scanner (IS) as previously mentioned. In step S32, the reading operation is started. The read image data of one frame is temporarily stored into the IMEM 11. This image data is displayed on the CRT 4 in step S33. Similarly to the case of the registration from the IS 31, a check is made to see if the image data has been correctly read or not (step S34). In step S36, a check is made to see if the image file is one-frame document or the first page of continuous frames or not. If YES in step S36, namely, when the image file is either of the one-frame document and the first page, step S40 follows. In step S40, the operator sets the key word 66. The search information record is stored into the HD 2 in step S42. The backup of the search information record is stored into the FPD 3 in step S44.

For the first image data, the operator sets the frame number of the microfilm. In the case of sequentially registering, it is sufficient that in step S30, the WS 10 increases the ADD field 62 by +1 and advances the microfilm by one frame. In the case of storing the search information records of the input image at random, the frame number is designated each time the search information record is stored. When the search information records have once been registered in the HD 2, all of the search information records are managed in the HD 2 in a manner similar to the case of the optical disc.

(Registration of the synthesized image)

With reference to FIGS. 11A to 11D, an explanation will now be made with respect to the case where the image read out of the microfilm and the image read out of the optical disc file are synthesized and the synthesized image is registered and its search information record is registered as the backup.

Figure 11A:
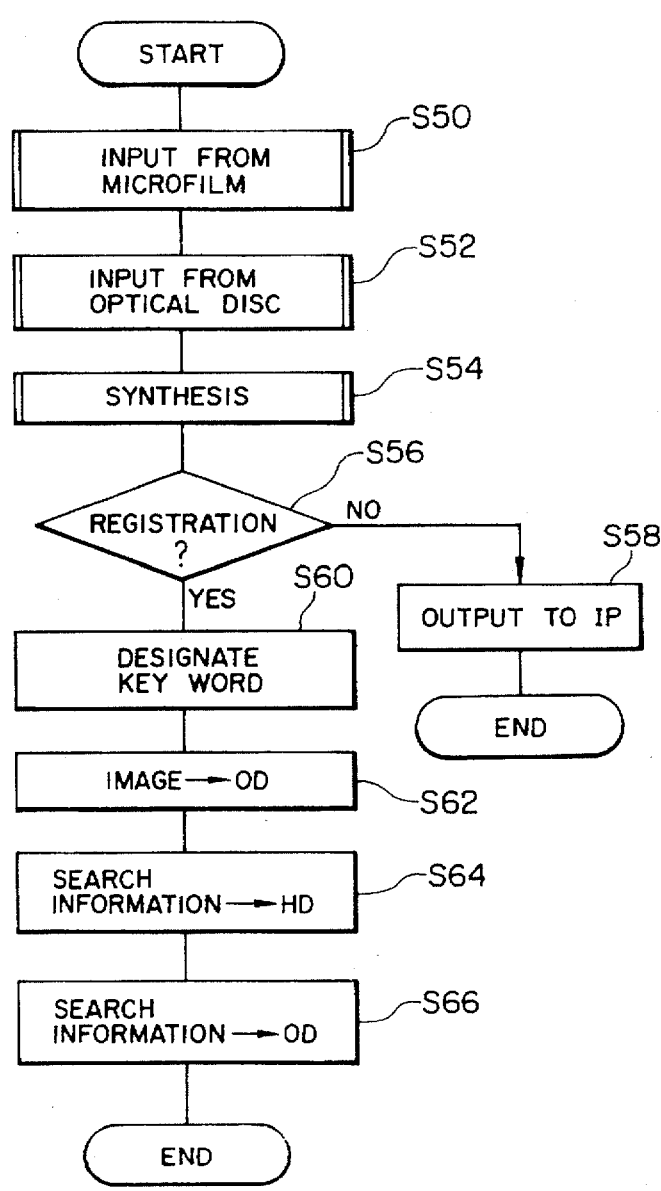
FIGS. 11A to 11D and 12 are control flowcharts illustrating a process in which images from a microfilm and images from an optical disc are synthesized and a conceptional diagram for explaining this control.
Figure 11B:
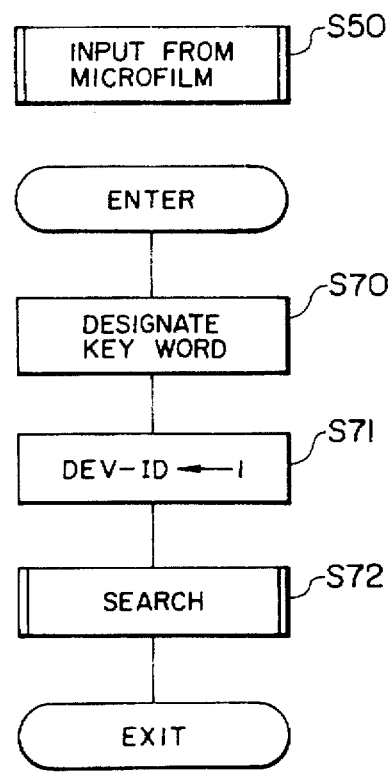
Figure 11D:
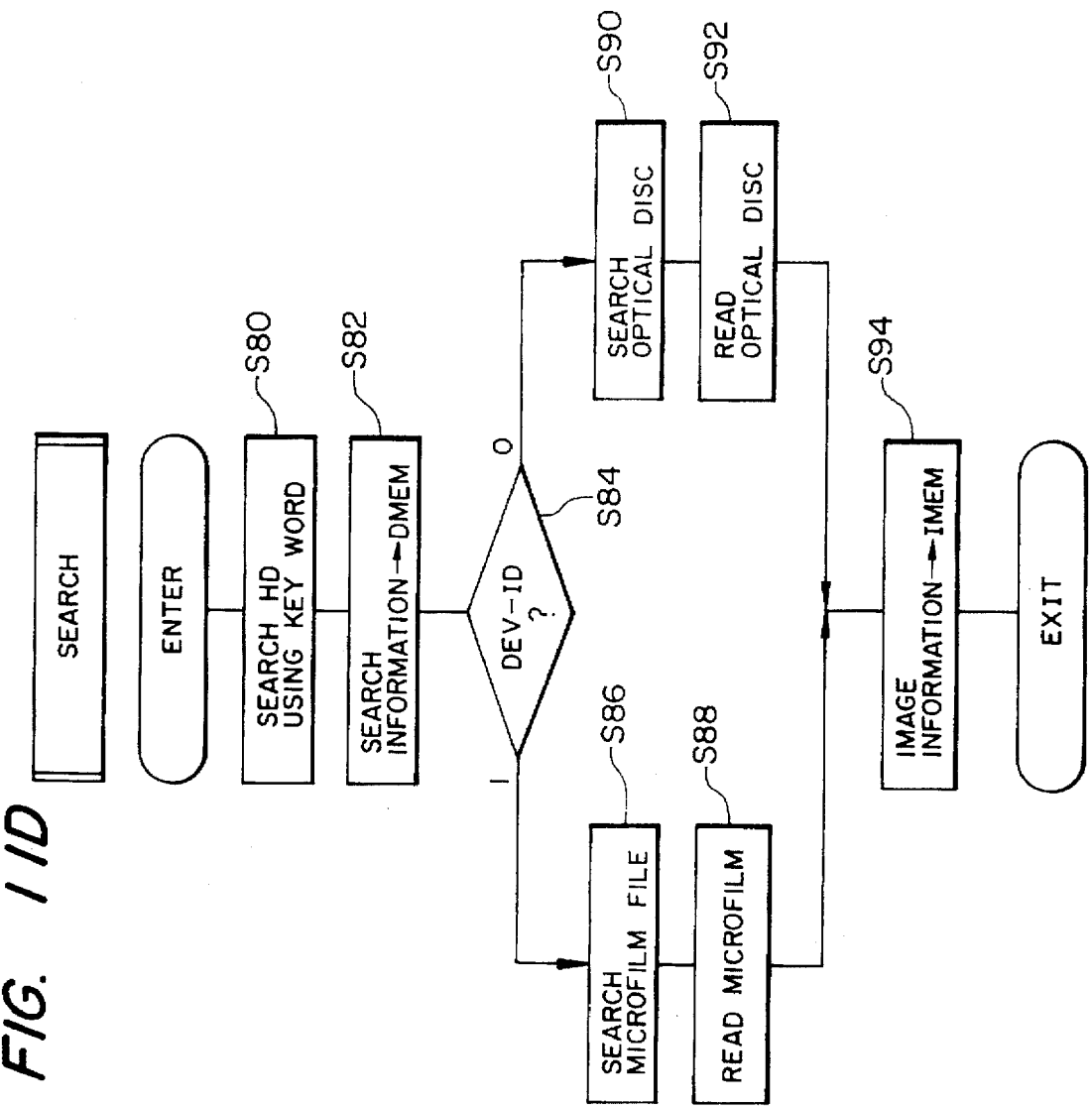
Figure 11C:
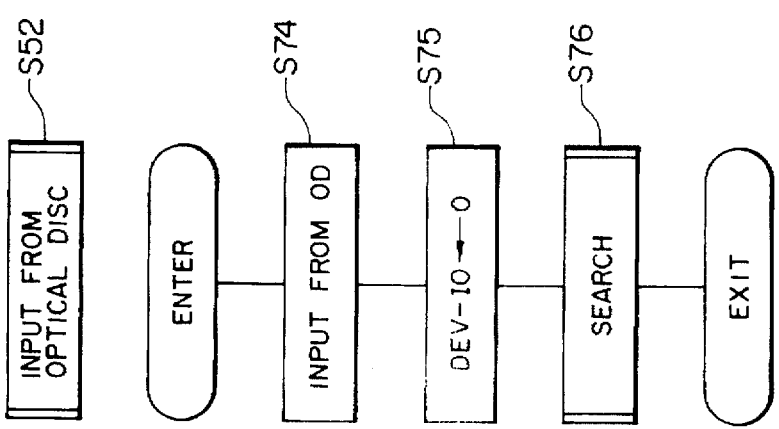

First, in step S50 in FIG. 11A, the image is input from the microfilm. In the next step S52, the image is input from the optical disc file 40. Steps S50 and S52 are the subroutines and their details are shown in FIGS. 11B and 11C, respectively. These subroutines are substantially similar except the key word 66 to be designated. In steps S72 and S76 in each subroutine, the search subroutine (FIG. 11D) is executed.

In the search subroutine the search information record having the designated key word 66 is searched in the HD 2 (step S80). The search information record found out is stored into the DMEM 20 (step S82). In step S84, a check is made to see if the image has been stored in the microfilm file 50 or in the optical disc file 40 from the value of the DEVID 61 in the search information record.

If the value of the identification mark DEV-ID 61 is "1", it is determined that the image has been recorded in the microfilm file 50. The corresponding image frame in the microfilm file 50 is searched on the basis of the address data ADD 62 of the search data (step S86). The image of the searched frame in the microfilm is read (step S88). If the value of the DEV-ID 61 is "0", the optical disc file 40 is searched on the basis of the address data ADD (step S90) and the image file is read out (step S92).

The image data read out of the microfilm file 50 or optical disc file 40 is stored into the IMEM 11 in the work station 10 by an amount of one page (step S94). In this manner, the search subroutine is finished.

Figure 12:
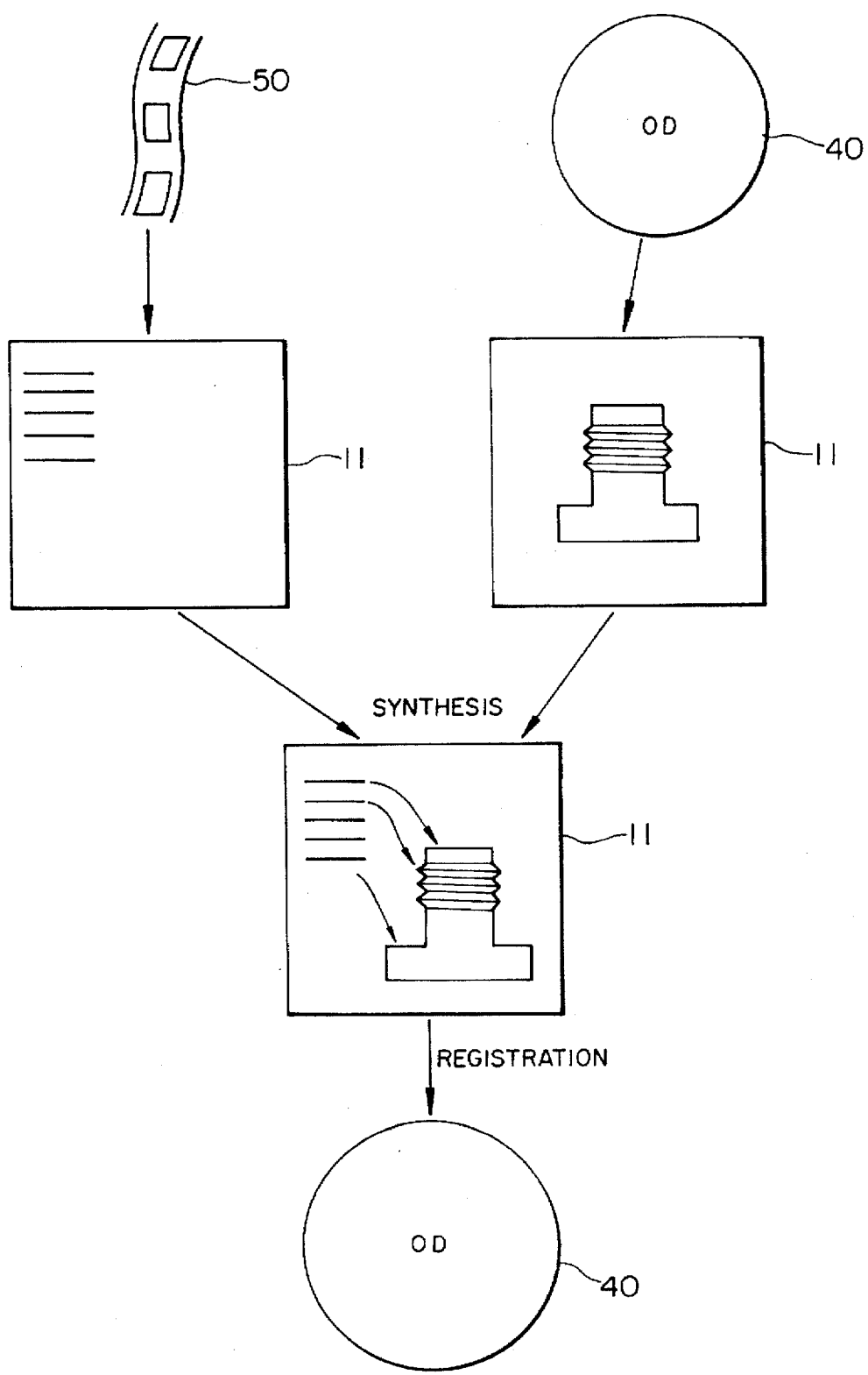

Returning to step S54 in FIG. 11A, two images stored in the IMEM 11 are processed by the BMU 16. If the processed images need to be registered, step S60 follows and the key word 66 is set to create the new search information record. In step S62, the processed images are stored into the optical disc file 40. In steps S64, the new search information record is stored into the HD 2. In step S66, the backup of the search information record is stored into the optical disc file 40. When the operations shown in FIGS. 11A to 11D will be described by reference to FIG. 6, the completion of the foregoing processes means that, for example, the image file "part" from the microfilm and the image file "name of part" from the optical disc file 40 have been synthesized and the new image file "part brochure" has been made in the optical disc file 40 (FIG. 12).

Although the synthesis of the images from the microfilm and optical disc has been described above, the image can be also similarly transferred from the microfilm to the optical disc.

(Loading of backup file)

Figure 13:
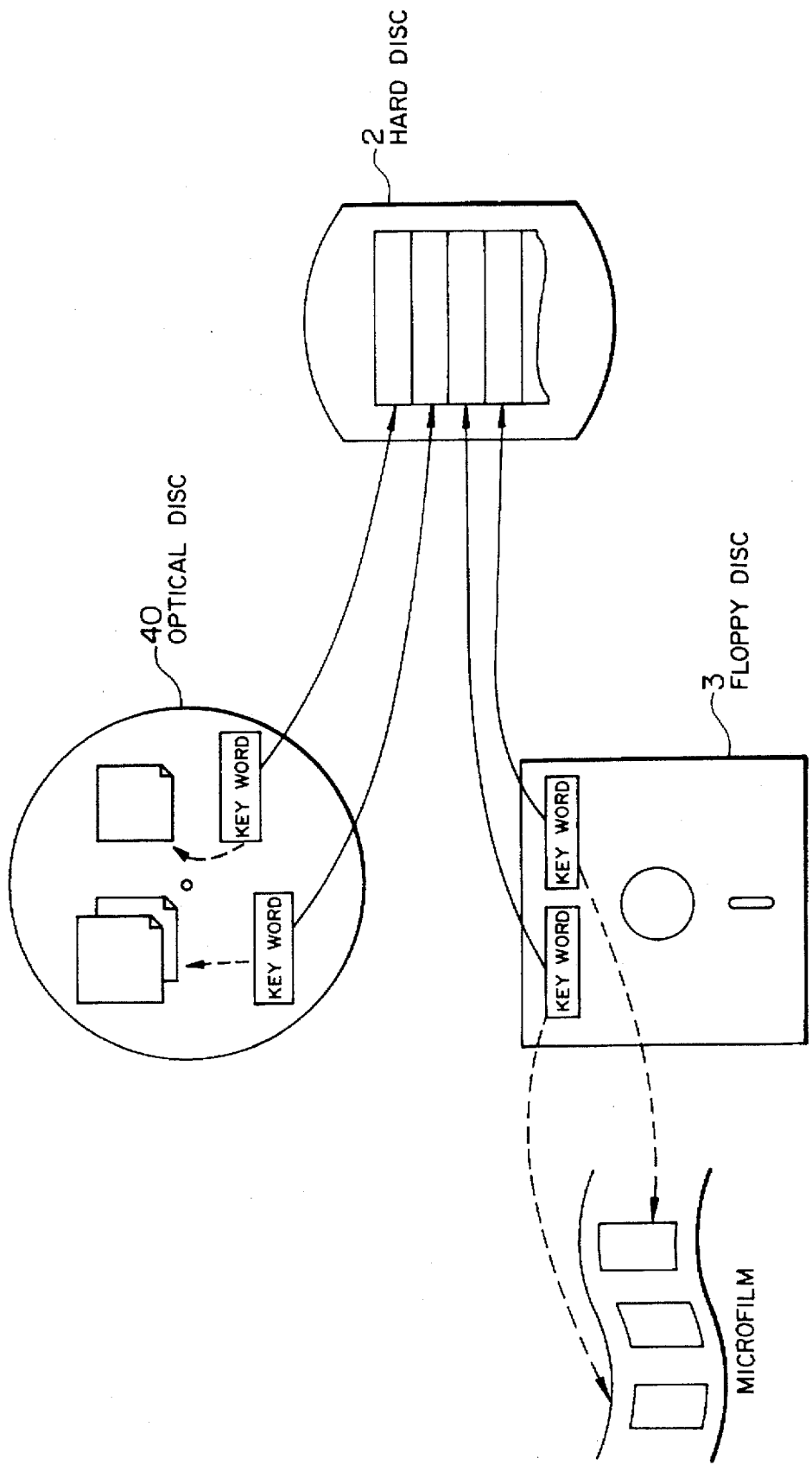
FIG. 13 is a conceptional diagram for explaining the reconstruction of the search information from the backup stored in an optical disc or a floppy disc (FPD)
Figure 14:
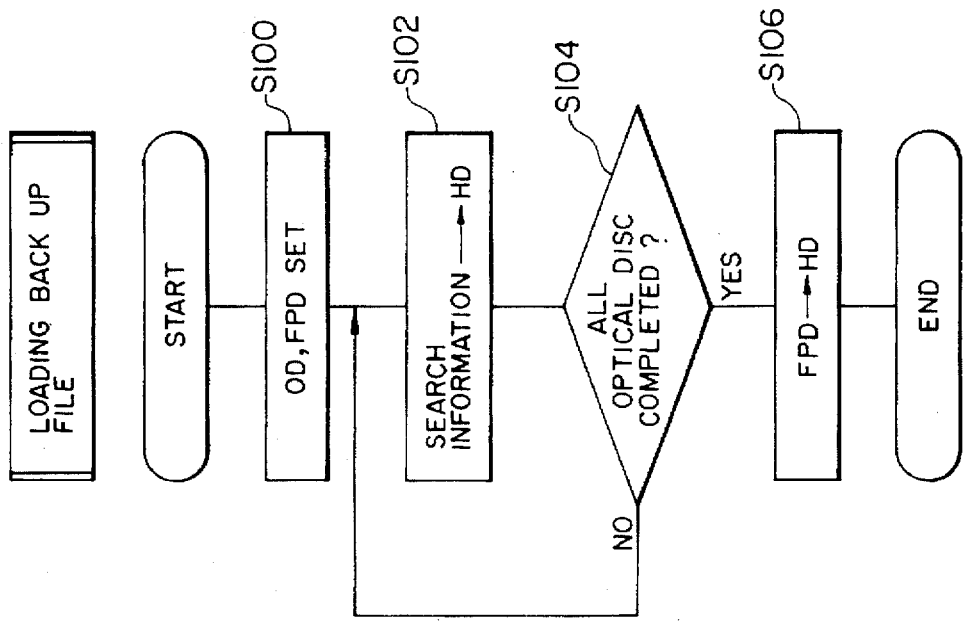
FIG. 14 is a flowchart for the normal restarting operation.

Loading of backup file denotes the operation such that, for example, when the search data in the HD 2 was broken due to some troubles or the like, or in execution of the initial process of the JOB program in an embodiment, which will be explained hereinafter, the search information record is reconstructed in the HD 2 from the optical disc file 40 and FPD 3 as shown in FIG. 5. FIG. 13 shows the concept of the operations in this case. FIG. 14 is a flowchart for the control procedure of these operations.

In FIG. 14, in step S100, the optical disc and FPD 3 in which the search information to be reconstructed has been stored are first set into the drives. In step S102, all of the search information records of the optical disc set are read out and stored into the HD 2. This operation is executed for all of the optical discs which need to be reconstructed. In the next step S106, the search information record of the microfilm file 50 is reconstructed from the FPD 3 similarly to the above. In this manner, the search information record can be extremely easily reconstructed.

(Deletion and recovery of the search information record)

Figure 15:
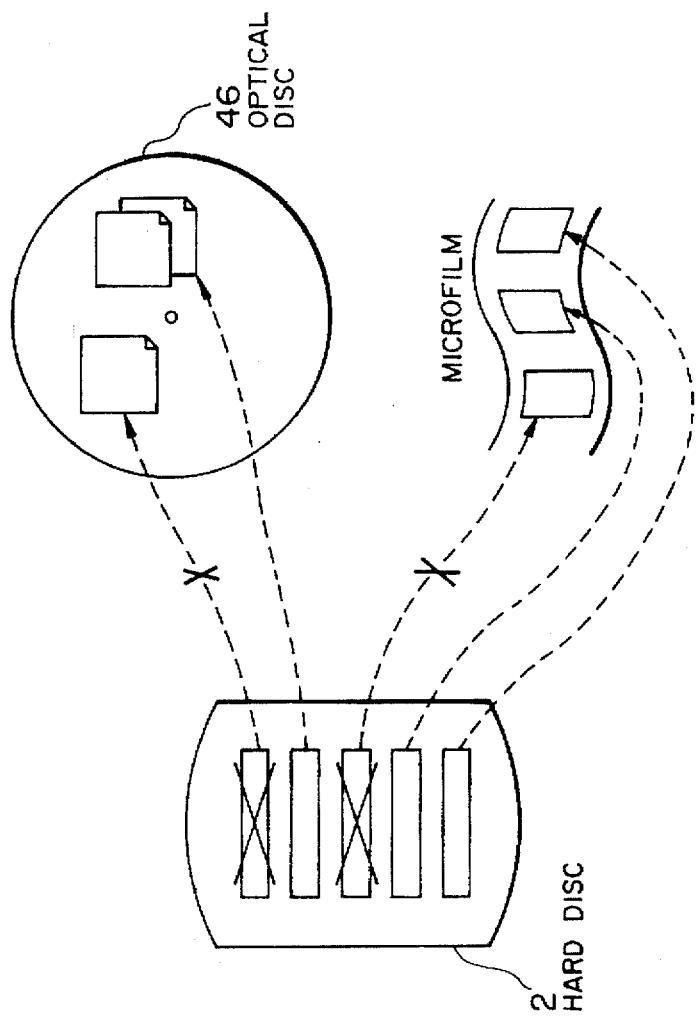
FIG. 15 is a conceptional diagram when the search information is deleted from only a hard disc.
Figure 16A:
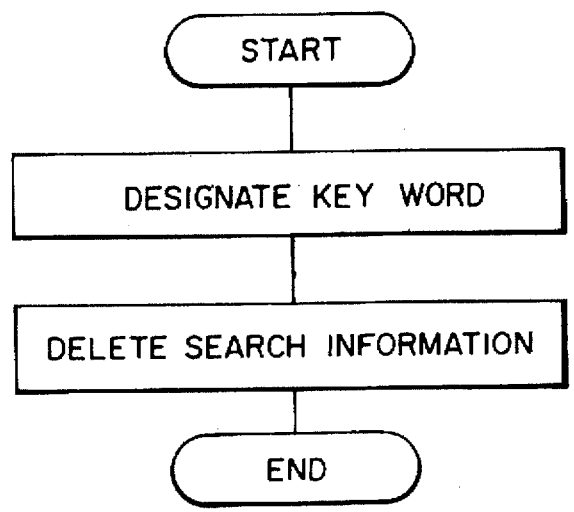
FIGS. 16A and 16B are control flowcharts when the search information is deleted from a hard disc and the deleted search information in the hard disc is reconstructed, respectively.
Figure 16B:
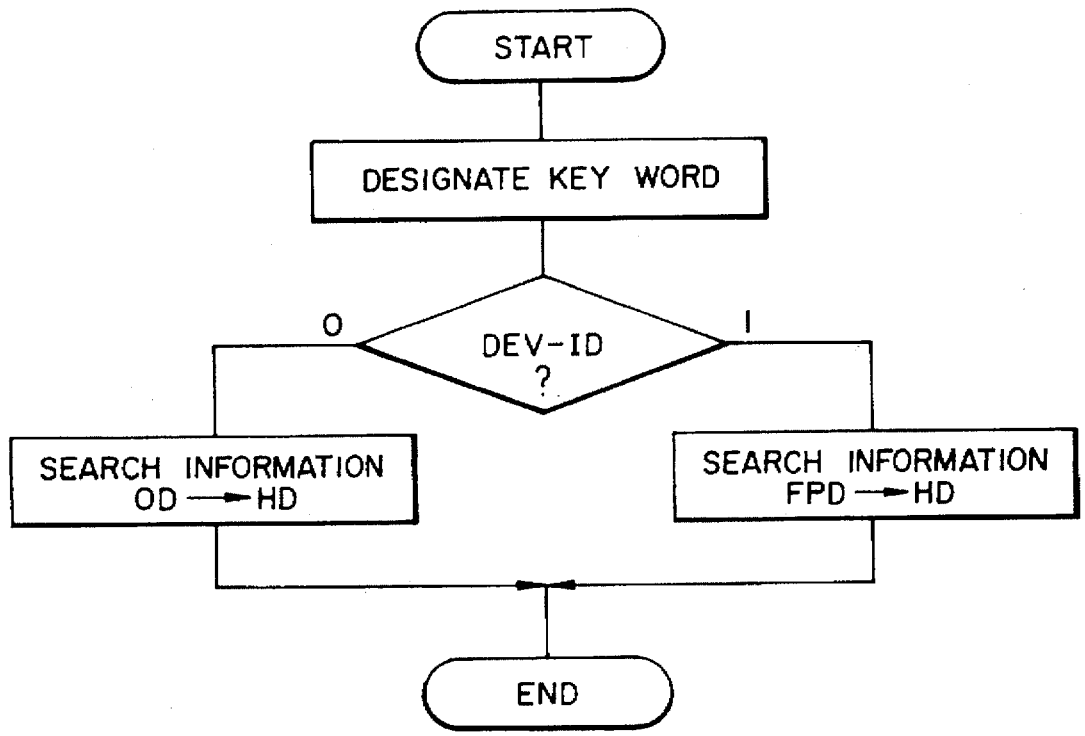

The example of reconstructing all of the search information records has been shown in the foregoing control procedures. However, it is fairly easy that by designating a special key word 66, only the search information record having the special key word 66 is reconstructed. Such an example is performed in the cases where a part of the search information record is deleted, so that it is recovered from the backup (in the OD or FPD) of the deleted search information record, and the like. FIG. 15 shows an example of deletion. The term "deletion" in this case obviously means that only the search information record in the HD 2 is deleted. FIGS. 16A and 16B show flowcharts for the control procedures of the deletion and reconstruction of the search information record, respectively. The outlines of these procedures will now be described. The key word 66 is first set on the CRT 4. The search information record in the HD 2 having the key word 66 is displayed on the CRT 4. The operator deletes a desired search information record (FIG. 16A). On the contrary, the deleted search information record is reconstructed in the following manner. The key word 66 is likewise set. The search information record obtained by the key word 66 is searched in the optical disc file 40 or FPD 3 and reconstructed (FIG. 16B).

(Effects of the embodiment)

As described above, the formats of the search information records for the optical disc file 40 and microfilm file 50 are set to the common format and the search information records for both files are mixedly stored into the common HD 2. Therefore, when the operator intends to search a desired image, he can obtain the desired image information by inputting the key word 66 corresponding to the image to be searched without considering the image file to be searched. Namely, the file (medium) in which the image is actually recorded and the address in this file are managed in the search information record. Thus, when a desired image is searched, the operator can easily unconditionally search the desired image without considering the composite media.

In addition, since the backup of the search information is stored in the optical disc or FPD 3, the search information can be easily reconstructed. The search information can be certainly managed by separately providing the medium for the backup. Further, by providing the backup, the search information of the information whose use frequency is low or of the old information can be deleted without anxiety. Therefore, the idle area can be held in the hard disc and the key word 66 of the new image information can be registered.

(Composite image filing system having an optical disc which is used for only the backup)

In the image filing system described above, the backup of the search information record of the microfilm has been stored into the FPD 3 and the backup of the search information record of the optical disc file 40 has been stored into the optical disc. In the composite filing system, which will be explained hereinafter, the foregoing search information records (including the search information records of both of a plurality of optical discs and microfilms) are stored into the optical disc which is used only for the backup. By providing such a backup dedicated optical disc, the following advantages are obtained. It is obvious that the image file can be also stored into the backup dedicated optical disc.

With an increase in scale of the composite filing system the number of optical discs and the number of microfilms also apparently increase. In such a situation, in many cases, the optical discs and microfilms which are used are classified for every JOB and the optical disc or microfilm only for use in this JOB is used. Moreover, even in the case of the same JOB, if there are JOBs for every hour, day, or month, there is a case where the operator desires to perform the JOB with the file construction of the latest date or month. There is also case where the operator wants to restart the JOB of a special date. In such cases, the advantage of the optical disc such that the image files are sequentially accumulated without being updated is used.

In those cases, if the search information records for every JOB or date (month) are stored as the backup into the backup dedicated optical disc, the operator needs not to check which one of the optical discs and microfilms is necessary for this JOB but it is sufficient for the operator to read and process the search information in the backup dedicated optical disc. Further, if the program and the like of the JOB are also stored into the backup dedicated optical disc, it is sufficient always to keep only the initial start program in the HD 2, so that the JOB can be easily restarted at a desired time.

As previously mentioned above, in the ordinary image filing system, it is inevitable to register the key word of the image file. Since an amount of this registering operation is large, when the key words have once been registered in the HD 2, in general, various JOB programs commonly use the search information in the HD 2. The common use of the search information makes it difficult to perform the file management for every JOB program and date as mentioned above. In addition, these search information are not systematically preserved but are preserved merely in accordance with the registration order.

(Outline of the JOB program)

Figure 24:
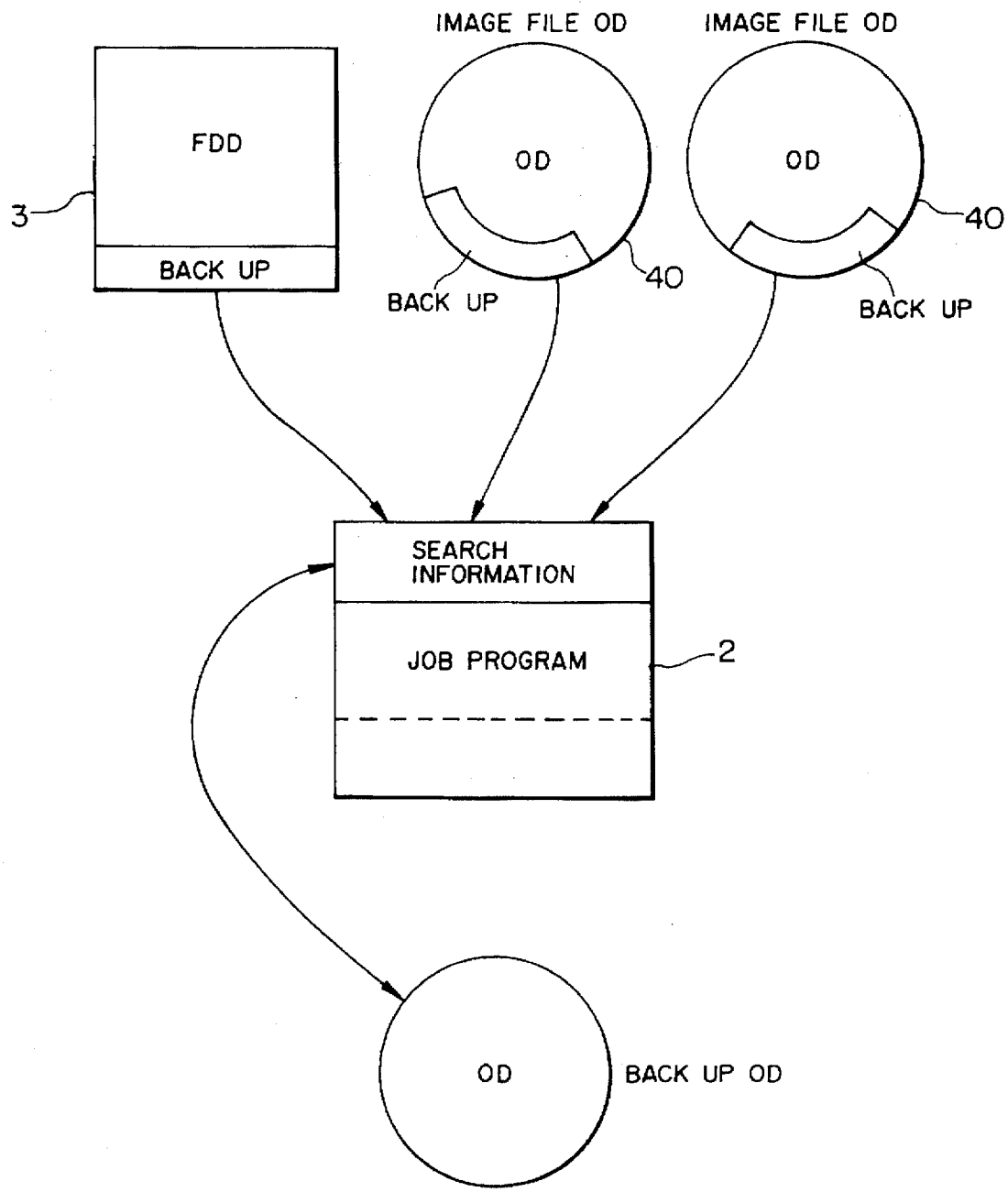
FIG. 24 is a conceptional diagram of the process of the JOB program in the embodiment.

The backup dedicated optical disc is proposed to meet the foregoing requirements. Therefore, the JOB program of the composite image filing system which is proposed in this embodiment has an outline as shown in FIG. 24. Namely, as shown in FIG. 24, it is assumed that the backup files of the search information of the image files of the microfilm and optical disc have already been stored in each of the backup areas in the FPD 3 and optical disc for the image file in accordance with the method of the foregoing embodiment. First, those backup files are copied into the HD 2 as the search information which is used in the JOB program. After completion of the JOB program, all of the search information in the HD 2 are again copied into the backup dedicated optical disc. The backup files copied in the backup dedicated optical disc are accumulated as the search information which belongs to the JOB program. Such a backup file for every JOB program is sequentially stored into the backup dedicated optical disc each time different JOB programs are run. Since the memory capacity of the optical disc is large, the optical disc can sufficiently store such a large amount of backup files. When the same JOB program is run, the search information having the backup dedicated optical disc and the image file is searched and reprocessed in accordance with the search information.

Figure 23:
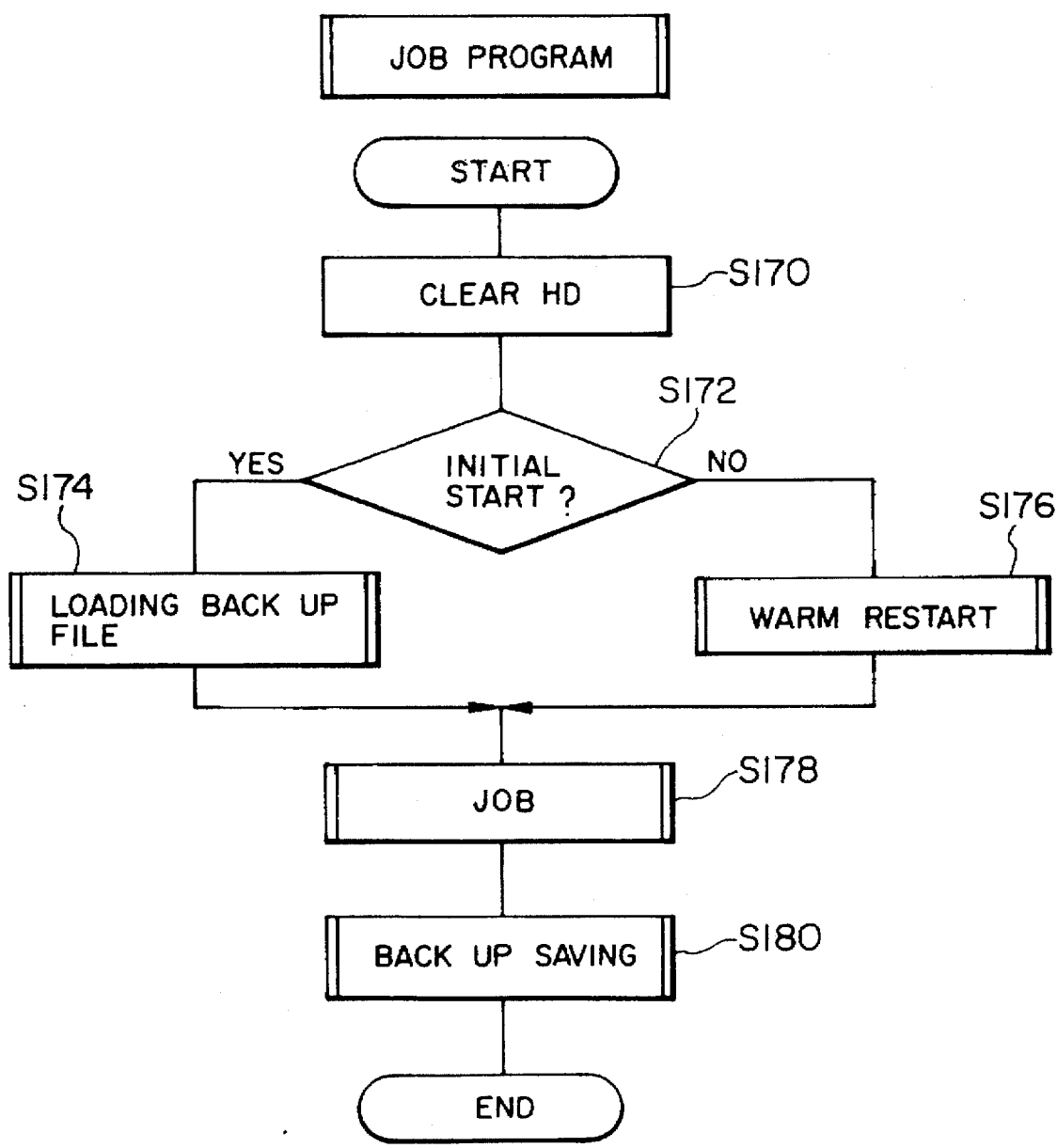
FIG. 23 is a schematic flowchart for the process of a JOB program in the embodiment.

An explanation will now be made with reference to a flowchart shown in FIG. 23. In step S170, the search information storing areas in the HD 2 are cleared. In step S172, a check is made to see if the JOB program is the initial start or not. If YES, the process for loading backup file (see FIG. 14) is executed in step S174. In step S174 for loading backup file, the floppy disc and optical disc which are necessary for this JOB are loaded into the drives. In execution for loading backup file, the search information stored on a JOB program unit bases is reconstructed in the HD 2. The JOB is executed in step S178 on the basis of the search information. In step S180, the latest search information developed in the HD 2 is copied into the backup dedicated optical disc (FIG. 20) (this flow will be explained in detail hereinafter). Therefore, when the JOB program is restarted, it is NO in step S176. In this warm restart routine, the search information is reconstructed in the HD 2 from the backup file in the backup dedicated optical disc as will be explained hereinafter.

(Constitution of the backup dedicated optical disc)

FIGS. 17A to 17E show examples of formats of records of the respective backup files which are written into the backup dedicated optical disc. FIG. 17A shows the format which is common to each record. In the diagram, numeral 70 denotes a type of record. The record type 70 includes four types from "0" to "3". FIGS. 17B to 17E show the records of the respective types. FIG. 17B shows the disc type record. The record type 70 of the disc type record is "0". When a type 71 of disc is "0", this means that the optical disc is the backup dedicated optical disc. When the disc type 71 is "1", it means that the optical disc is the ordinary optical disc as previously mentioned.

FIG. 17C shows the JOB record. The record type 70 for the JOB record is "1". The JOB name is stored into a field 72. The data when the JOB record was written into the backup dedicated optical disc is stored into a field 73. The volume name of the optical disc or the like which is used for this JOB is stored into a field 74. FIG. 17D shows the search information record. The record type is "2". The search information shown in FIG. 4B is stored into a field 75. FIG. 17E shows the program record. The record type 70 is "3". If the paging or segmentation has already been performed, the program can be stored into the backup dedicated optical disc with a predetermined record length.

FIGS. 18A and 18B show examples of arrangements of the respective records in the backup dedicated optical disc shown in FIGS. 17A to 17E. A disc-type record 80 indicates that the optical disc is the backup dedicated optical disc. All of a search information record 82 after a JOB record 81 and the records subsequent to the record 82 are the search information of the optical disc files or microfilms which were used in this JOB. The JOB program is stored into a JOB program 83. A JOB record 84 denotes that another JOB record and search information records newly follow.

(Storage into the backup dedicated optical disc)

The backup files are stored into the backup dedicated optical disc in accordance with the priorities. FIG. 19A shows the numbers of the respective drives of the optical discs which are connected to the composite image filing system of the invention. The drive having the smaller number is located near the operator and has the higher priority. The total number of optical discs which are connected to the composite filing system is, e.g., up to eight. FIG. 19B shows flags in the DMEM 20 and each flag indicates whether the corresponding optical disc drive is currently used or not.

Figure 20:
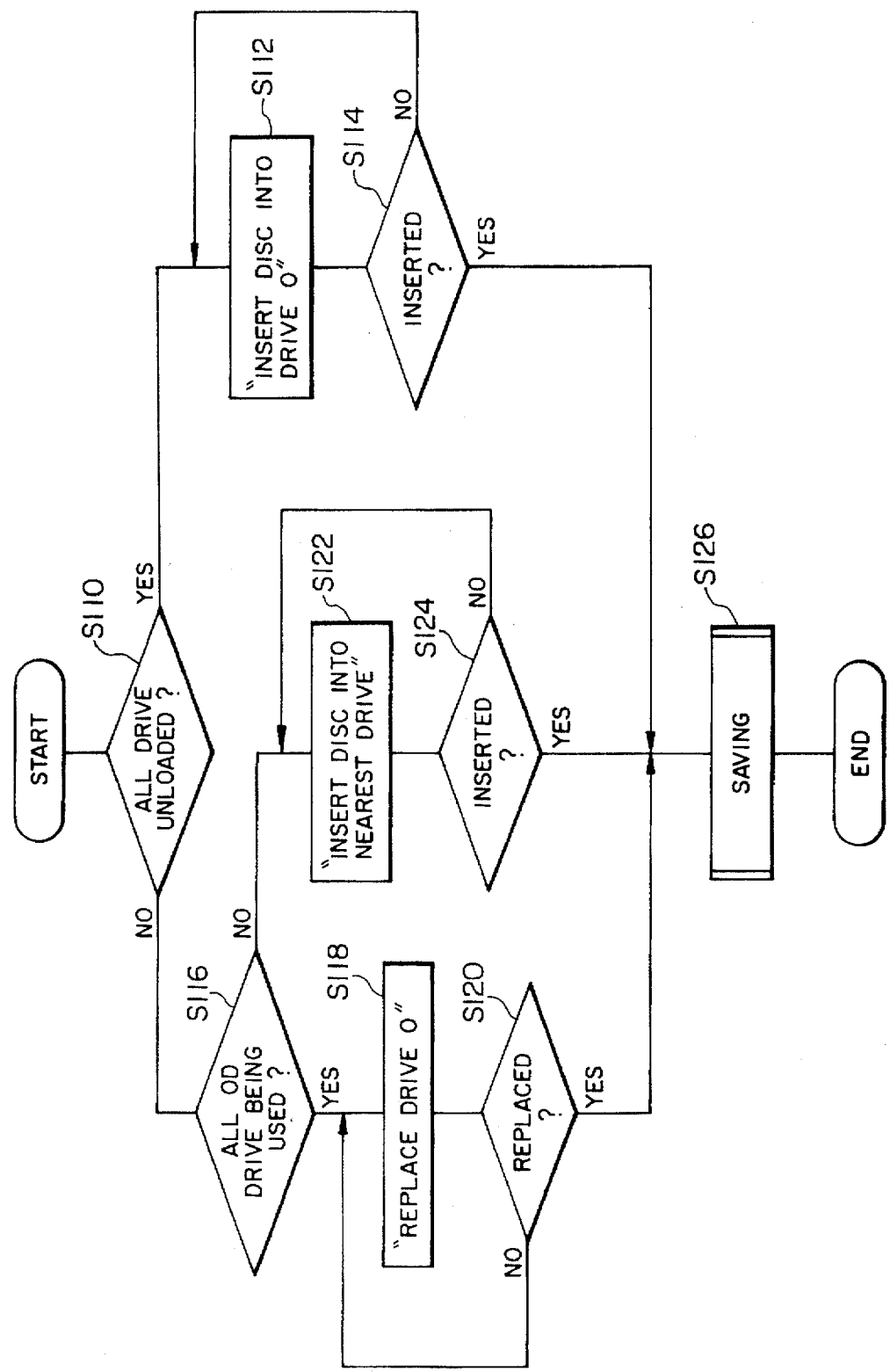
FIG. 20 is a control flowchart when backup files are saved in an optical disc which is used for only the back in consideration of the priorities.

FIG. 20 is a flowchart for explaining the order to determine into which drive the backup dedicated optical disc is loaded in the arrangement of the optical discs shown in FIGS. 19A and 19B. The reason why the control of the flowchart as shown in FIG. 20 is necessary is because consideration is paid to the operating efficiency of the operator in the case where many optical disc drives are connected as shown in FIGS. 19A and 19B. Namely, the WS 10 independently determines the drive into which the backup dedicated optical disc should be loaded such that the position of the drive is the most inconvenient for the operator. The WS 10 displays the drive number on the CRT 4, thereby instructing the operator to load the backup dedicated optical disc into this drive.

First, a check is made to see if all of the drives are unloaded or not in step S110. If YES, the message "Insert Disc into Drive 0" is displayed on the CRT 4 in step S112. The drive "0" is selected since it is nearest to the operator. After the backup dedicated optical disc was loaded into the drive "0", the subroutine for saving into the backup dedicated optical disc is executed in step S126. When it is determined that either one of the optical discs is being used in step S110, a check is made to see if all of the optical disc drives are being used or not in step S116. If YES, the message "Replace Drive 0" is displayed on the CRT 4 in order to insert the backup dedicated optical disc into the drive "0" because of the same reason. If it is decided that some of the drives are unloaded in step S116, the drive nearest to the operator among those unloaded drives (i.e., the drive of the smallest number) is specified and the message "Insert Disc into Nearest Drive" is displayed on the CRT 4. All of the above discriminating processes are performed with reference to the flags in FIG. 19B.

Figure 21:
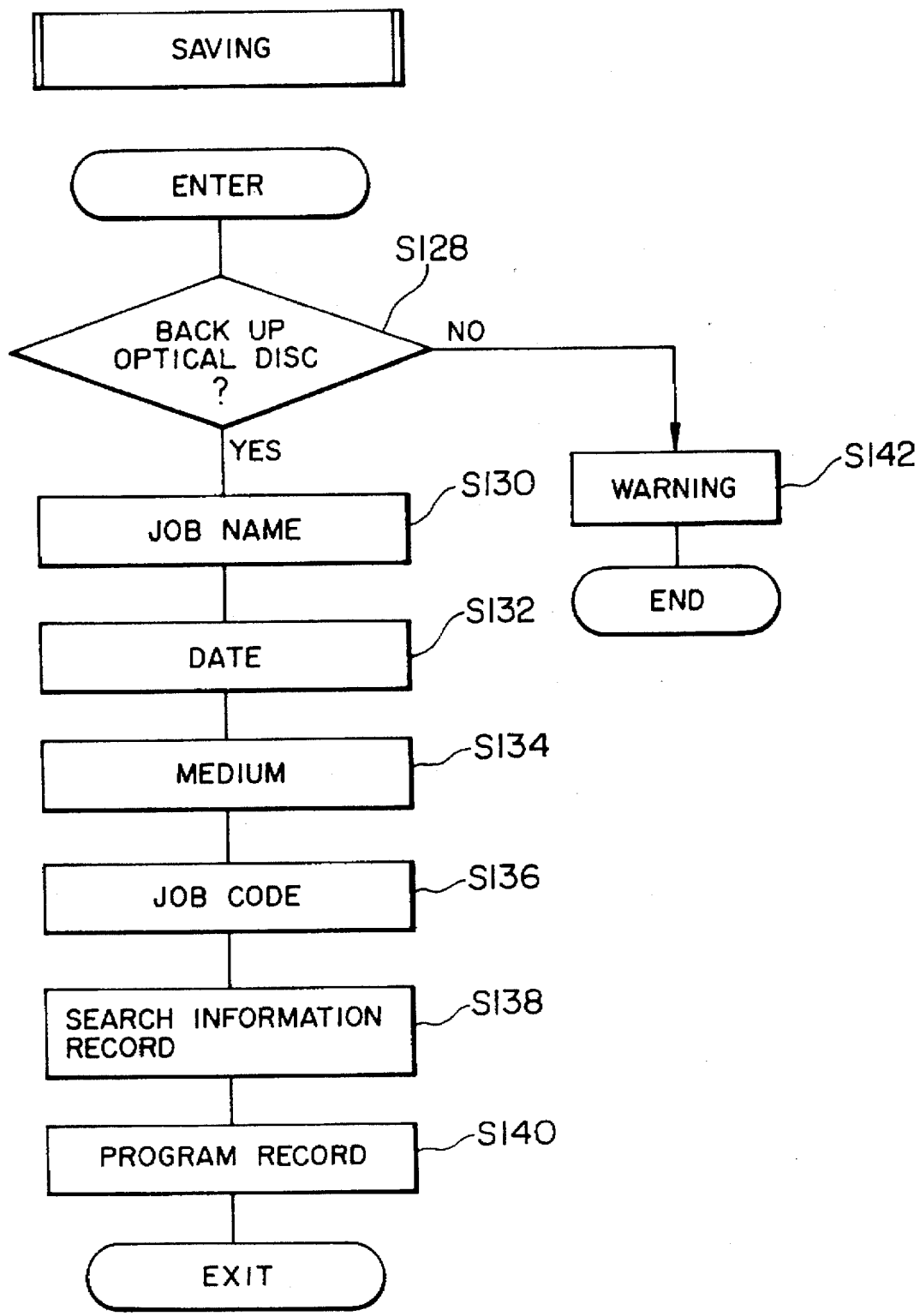
FIG. 21 is a flowchart for a subroutine of one step in FIG. 20.

FIG. 21 shows the details of step S126 in FIG. 20 as the saving subroutine. First, a check is made in step S128 to see step S128 to see if the inserted optical disc is the backup dedicated optical disc or not by examining the disc-type record (FIG. 17B). The JOB record (FIG. 17C) is set in steps S130 to S134. The JOB record is written into the backup dedicated optical disc in step S136. The search information record (FIG. 17D) and program record (FIG. 17E) are subsequently written in steps S138 and S140. The point that the search information record of the microfilm is also together written differs from the embodiment shown in FIG. 5 as previously mentioned above.

(Warm restart)

In the warm restart process, the JOB record, search information record, and the like are read out of the backup dedicated optical disc and developed in the HD 2 and this JOB is restarted. This restart process is suitable for the system in which the optical disc or microfilm which is used for every JOB is properly used for each JOB. The operator of the JOB can access all search information from the backup dedicated optical disc by the JOB record corresponding to the JOB. Since the search information is backed up, the search information need not be reregistered for every JOB and the image filing system can be readily used. This system is also effective even when the reliability of the data in the HD 2 is low or the like.

Figure 22:
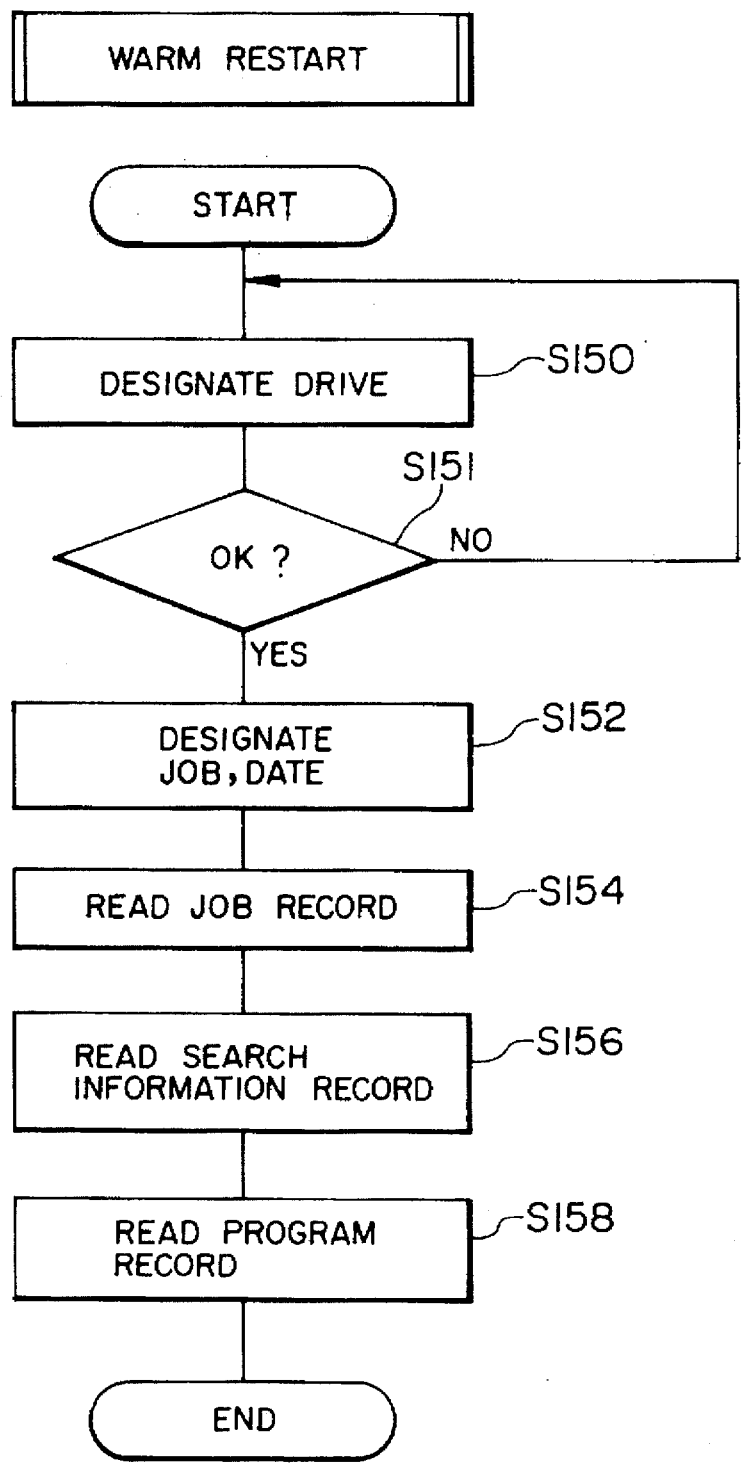
FIG. 22 is a flowchart for the warm restarting operation.

FIG. 22 shows a flowchart for the control procedure of the warm restart. If this control program has been stored in the HD 2, it is read out of the HD 2 into the PMEM 9. However, the control program is also preliminarily stored into an ROM or the like (not shown) in consideration of the case where the high reliability of the HD 2 is not expected. In the first step S150, the drive number of the optical disc in which the backup dedicated optical disc is loaded is designated by way of the CRT 4. After it was confirmed that the optical disc loaded in this drive is the backup dedicated optical disc (step S151), the name of JOB which the operator wants to restart, date, and the like are input in step S152. In step S154, the JOB record corresponding to the JOB name and the like which were input is searched in the backup dedicated optical disc. If this JOB record is found out, the search information record subsequent to the JOB record is read and developed in the HD 2 in step S156. If necessary, the program is also read and developed in the HD 2 in step S158. In this manner, the search information record can be fairly easily reconstructed by a desired system constitution which meets the JOB. The operator displays the volume name in the JOB record on the CRT 4 and can know the optical disc and microfilm which are necessary for the JOB from his own room. Therefore, it is sufficient for the operator to prepare the proper optical disc and microfilm in accordance with the instruction displayed on the CRT 4.

(Effects of the embodiment having the backup dedicated optical disc)

As described above, according to the image filing system having the backup dedicated optical disc, (1) all of the search information and the program can be stored; and
(2) the file constitution of the image filing system can be reconstructed from the copy of the search information managed in the JOB record in the backup dedicated optical disc.

Therefore, the JOB—file management can be performed for every JOB or data. Namely, the file management can be systematized on the basis of the JOB program.

As described above, according to the present invention, the composite image filing system in which the microfilm and one or a plurality of optical discs are organically combined can be provided. Or, by storing the backup of the search information of the optical disc image file into this optical disc, the security of the search information is assured and the search information can be easily managed.

Again, since the backup of the search information of the microfilm image file is stored into another memory means, e.g., into the floppy disc, the security of the search information of the microfilm file is assured and the search information can be easily managed.

Again, by storing the backup of all of the search information of all image files into the optical disc, the security of the search information is assured and the search information can be easily managed. Further, by providing the backup dedicated optical disc and by storing the backup into this disc, the search information can be further easily managed.

Again, it is possible to provide the composite image filing system which can systematically integrally manage the image files, can efficiently process the operations to handle the image files, and can keep the security of the image files regarding the programs.

As described in detail above, according to the invention, it is possible to provide the filing system which can manage a plurality of recording media of different characteristics as the image files and in which at least a part of the search information of the image files is held in either one of these recording media.

As described above, according to the invention, when the search information is preserved as the backup, the operator can easily perform the operation to determine the optical disc drive for preservation of the search information for the backup. On the other hand, according to one embodiment of the invention, in the composite image filing system such that the type of optical disc which is used to preserve the backup search information is predetermined, such an optical disc is instructed so as to be inserted into the drive which is determined in accordance with a desired priority. Therefore, the drive disposed at the optimum driving position where it can be most easily operated by the operator is determined without the aid of the operator.

We claim:

1. A filing system comprising:

first random access file means for recording image information;

second file means for recording image information, said first random access file means being larger in capacity than said second file means; and memory means for storing a plurality of pieces of search information each used for searching said first and/or second file means for corresponding image information; each piece of the search information including identification information identifying said first and/or second file means which stores the corresponding image information, wherein at least one of the plurality of pieces of search information stored in said memory means are sent to and stored in said first file means if its identification information identifies said first file means, and at least one of the plurality of pieces of search information stored in said memory means are sent to and stored in an external storage means if its identification information identifies said second file means.

2. A filing system according to claim 1, wherein said first random access file means utilizes an optical disc and said second file means utilizes a microfilm.

3. A filing system according to claim 1, wherein the search information relating to image information is stored in said first random access file means when the image information is recorded in said first random access file means.

4. A filing system comprising:

one or more first random access file means which can record image information;

a plurality of second file means which can record image information, said first random access file means being larger in capacity than said second file means;

editing means for synthesizing the image information read from said first random access file means and the image information read from said second file means with each other, wherein said editing means further comprises means in which search information to integrally manage said image information recorded in said first random access and second file means is stored, wherein the search information comprises identification information for indicating in which one of the first random access file means and the second file means the image information is stored, position information for indicating a position at which the image information is stored in a format corresponding to the identification information, and keyword information for searching the image information;

search means for comparing information input by input means with the search information and for searching information for outputting image information;

writing means for writing the search information in said first random access file means if the identification information indicates said first random access file means;

control means for writing the search information in an external memory if the identification information indicates said second file means; and reading means for reading the search information from said first random access file means and/or from said external memory, and for storing the read search information in said editing means, wherein said reading means reads the search information as required from said first random access file means and/or from said external memory.

5. A filing system according to claim 4, wherein said first file means utilizes an optical disc and said second file means utilizes a microfilm.

6. A filing system according to claim 4, wherein said editing means is a work station having display means, data input means, and a buffer to store image date.

7. A filing system according to claim 4, wherein said writing means writes the search information relating to image information in said first random access file means when the image information is recorded in said first random access file means.

8. A filing system according to claim 4, wherein said reading means reads a specific piece of the search information from said first random access file means and/or from said external memory.

9. A filing system according to claim 4, wherein said writing means writes the search information for said one or more first random access file means in one of said one or more of first random access file means.

10. A filing method comprising the steps of:

providing image information in one or more first random access file means which can record image information;

providing image information in a plurality of second file means which can record image information, the first random access file means being larger in capacity than the second file means;

synthesizing image information read from the first random access file means and image information read from the second file means with each other, using an editing means, wherein the image information recorded in the first random access and second file means is integrally managed using search information stored in a memory in the editing means, wherein the search information comprises identification information for indicating in which one of the first random access file means and the second file means the image information is stored, position information for indicating a position at which the image information is stored in a format corresponding to the identification information, and keyword information for searching the image information;

comparing information input by input means with search information from a search means and for searching information for outputting image information;

storing the search information in the first random access file means if the identification information indicates the first random access file means;

storing the search information in an external memory if the identification information indicates the second file means; and reading the search information from the first random access file means and/or from the external memory, and storing the read search information in the editing means, wherein said reading step reads the search information as required from the first random access file means and/or from the external memory.

11. A filing method according to claim 10, wherein the first file means utilize an optical disc and the second file means utilize a microfilm.

12. A filing method according to claim 10, wherein said synthesizing step is performed using a work station having display means, data input means, and a buffer to store image date.

13. A filing method according to claim 10, wherein said storing step stores the search information relating to image information in said first random access file means when the image information is recorded in said first random access file means.

14. A filing method according to claim 10, wherein said reading step reads a specific piece of the search information from said first random access file means and/or from said external memory.

15. A filing method according to claim 10, wherein said storing step stores the search information for said one or more first random access file means in one of said one or more random access file means.

* * * * *

UNITED STATES PATENT AND TRADEMARK OFFICE
CERTIFICATE OF CORRECTION

PATENT NO. : 5,729,715

DATED : March 17, 1998

INVENTOR(S): KENZO INA ET AL.

It is certified that error appears in the above-identified patent and that said Letters Patent is hereby corrected as shown below:

[57] ABSTRACT

Line 13, "a" should read --an--.

COLUMN 1

Line 43, "the" (first occurrence) should be deleted.

COLUMN 2

Line 64, "in" should read --is--.

COLUMN 4

Line 1, "diagram" should read --diagrams--.

COLUMN 5

Line 7, "the" should be deleted.

COLUMN 6

Line 67, "the processes" should read --processing--.

COLUMN 10

Line 16, "scanner. (Relation" should read
      --scanner. ¶ (Relation--.
    Line 45, "construction" should read --format--.

UNITED STATES PATENT AND TRADEMARK OFFICE
CERTIFICATE OF CORRECTION

PATENT NO. : 5,729,715

DATED : March 17, 1998

INVENTOR(S) : KENZO INA ET AL.

It is certified that error appears in the above-identified patent and that said Letters Patent is hereby corrected as shown below:

COLUMN 11

Line 5, "memory" should read --memory capacity--.

COLUMN 15

Line 47, "case" should read --a case--.
    Line 53, "needs not to" should read --need not--.

COLUMN 16

Line 55, ""3"" should read --"3".--.

COLUMN 19

Line 42, "tion;" should read --tion,--.

UNITED STATES PATENT AND TRADEMARK OFFICE
CERTIFICATE OF CORRECTION

PATENT NO. : 5,729,715
DATED : March 17, 1998
INVENTOR(S) : KENZO INA ET AL

It is certified that error appears in the above-indentified patent and that said Letters Patent is hereby corrected as shown below:

Column 22

Line, 7, "date." should read --data.--.

Signed and Sealed this

Twenty-fifth Day of August, 1998

Attest:

BRUCE LEHMAN

Attesting Officer

Commissioner of Patents and Trademarks